United States Patent [19]

Ely et al.

[11] Patent Number: 5,796,424
[45] Date of Patent: Aug. 18, 1998

[54] SYSTEM AND METHOD FOR PROVIDING VIDEOCONFERENCING SERVICES

[75] Inventors: Thomas Chambers Ely, Bridgewater; Darek Andrew Smyk, Piscataway, both of N.J.

[73] Assignee: Bell Communications Research, Inc., Morristown, N.J.

[21] Appl. No.: 741,584

[22] Filed: Nov. 1, 1996

Related U.S. Application Data

[63] Continuation of Ser. No. 431,989, May 1, 1995, abandoned.
[51] Int. Cl.$^6$ ............................................. H04M 11/00
[52] U.S. Cl. ........................... 348/15; 348/16; 370/260
[58] Field of Search ............................. 348/15, 14, 16; 379/202, 204, 205; 370/260, 261, 263, 264

[56] References Cited

U.S. PATENT DOCUMENTS

| | | | |
|---|---|---|---|
| 5,042,062 | 8/1991 | Lee et al. | 379/94 |
| 5,065,393 | 11/1991 | Sibitt et al. | 370/62 |
| 5,323,445 | 6/1994 | Nakatsuka | 370/62 |
| 5,329,572 | 7/1994 | Martens | 348/16 |
| 5,402,418 | 3/1995 | Shibata et al. | 370/62 |
| 5,434,852 | 7/1995 | LaPorta et al. | 370/94 |
| 5,506,954 | 4/1996 | Arshi et al. | 348/15 |
| 5,592,478 | 1/1997 | Weiss | 370/260 |
| 5,657,096 | 8/1997 | Lukacs | 348/15 |

*Primary Examiner*—Stella Woo
*Attorney, Agent, or Firm*—Joseph Giordano; David A. Hey; Loria B. Yeadon

[57] ABSTRACT

A broadband system includes a broadband switch network, a broadband session controller, and a broadband service control point. The broadband network provides connections between information sender/receivers in response to instructions from a broadband service control point or in response to requests originated by an information sender/receiver. The broadband service control point provides processing instructions and/or data to the broadband controller and information sender/receiver. Applications supported by the broadband network include video-on-demand and videoconferencing services for system users. For video-on-demand, a settop controller is associated with a video display of each system user. One or more video information providers ("VIPs") stores video information to be sent to the user's settop controller via the broadband switch network. The broadband session controller communicates with the user's settop controller and VIPs and requests processing information from the broadband service control point in response to predetermined triggers. The broadband session controller instructs the broadband switch network to establish the broadband connection between the VIP and a predetermined settop controller. For settop controller-based videoconferencing, the settop controller controls cameras, microphones, video displays, and speakers. In addition, an integrated service control point integrates broadband and telephone networks to provide efficient and effective integrated broadband and telephone services. Both broadband and telephone services can be provisioned via a video interface at a user's remote location. Also, the integrated network provides unique caller identification delivery services.

2 Claims, 24 Drawing Sheets

FIG. 22

- 2200 — TURN ON INCOMING CALL BLOCKING: ☐
- 2202 — TEL NBR EXCLUDED FROM BLOCKING: [     ]
- 2204 — TURN ON THE CALLER ID DISPLAY: ☐
- 2206 — CALL HISTORY: ☐

2208 CANCEL    2210 OK

FIG. 23

CALL HISTORY

2300:
- ROBERT SMITH (908) 789-8000, 1:16 PM, 1/19/95, DELIVERED
- ROBERT SMITH (908) 789-8000, 1:14 PM, 1/19/95, BLOCKED
- JOHN ADAMS (908) 567-5000, 9:54 AM, 1/19/95, DELIVERED
- JOHN ADAMS (908) 567-5000, 9:13 AM, 1/19/95, DELIVERED
- JOHN ADAMS (908) 567-5000, 4:44 PM, 1/16/95, DELIVERED

MORE... — 2302

PREVIOUS — 2304

SYSTEM AND METHOD FOR PROVIDING VIDEOCONFERENCING SERVICES

This application is a continuation of Ser. No. 08/431,989 filed May 1, 1995 now abandoned.

CROSS REFERENCE TO RELATED APPLICATIONS

This application is related to U.S. patent application Ser. No. 08/432,580; U.S. patent application Ser. No. 08/432,586; now U.S. Pat. No. 5,583,427, Dec. 10, 1996; U.S. patent application Ser. No. 08/432,581, now U.S. Pat. No. 5,574,778, Nov. 12, 1996; U.S. patent application Ser. No. 08/432,582, now U.S. Pat. No. 5,574,779 Nov. 12, 1996; and U.S. patent application Ser. No. 08/432,578, now U.S. Pat. No. 5,696,815 Dec. 9, 1997, filed on even date herewith, the contents of which are incorporated by reference.

This application is also related to U.S. patent application Ser. No. 07/934,240, entitled "System and Method for Creating, Transferring, and Monitoring Services in a Telecommunication System," filed Aug. 25, 1992, by Zaher A. Nazif et al. now abandoned; U.S. patent application Ser. No. 07/972,529, entitled "System and Method for Creating, Transferring, and Monitoring Services in a Telecommunication System," filed Nov. 6, 1992 by Zaher A. Nazif et al. now abandoned; and U.S. patent application Ser. No. 07/972,817, entitled "A Method of Creating a Telecommunication Service Specification," filed Nov. 6, 1992, by Susan K. K. Man et al., now U.S. Pat. No. 5,450,480, Sep. 12, 1996 The contents of these applications are also incorporated by reference.

BACKGROUND OF THE INVENTION

The present invention relates generally to telecommunication networks and services and more specifically to broadband networks and services.

By comparison to today's mature telephony networks, nationwide broadband networks are in their early infancy phase. In this application, the term broadband includes video information (both moving and still images) as well as conventional voice and alphanumeric data. Over the past few years, the industry has spent considerable effort to develop broadband access, switching, and transmission technology. However, little effort has been devoted to integrating and controlling broadband networks. As a result, there is no commonly accepted architecture for the control of broadband networks. In addition, there are very few standards or industry requirements defining control functions, interfaces, and protocols for broadband networks.

While certain vendors, e.g. AT&T and Fujitsu, may offer end-to-end solutions with control capacities integrated into broadband access and switching products, these approaches are proprietary and, when considered for large scale deployment, are characterized by the same drawbacks and challenges which were attributed to switch based telephony services over 20 years ago, i.e., service implementation, deployment and uniformity problems, as well as, limited service customization.

It is therefore desirable to provide a broadband network and services that substantially obviate one or more of the problems due to limitations and disadvantages of the related art.

It is also desirable to provide a broadband network in which network operators can quickly respond to changing market demands to rapidly create, test, and deploy new services in the broadband network.

It is further desirable to extend existing service creation and service control features and functionality to support the creation and execution of broadband services in a broadband network.

It is still further desirable to provide a system and method for generating broadband services and for provisioning those broadband services in an execution environment quickly and efficiently.

It is desirable to provide efficient and inexpensive systems and methods for providing video-on-demand services.

It is also desirable to provide efficient and inexpensive systems and methods for providing videoconferencing services.

It is also desirable to provide an integrated broadband network and telephone network.

It is also desirable to provide an integrated broadband/telephone network in which network operators can quickly respond to changing market demands to rapidly create, test, and deploy new services.

It is further desirable to provide a system and method for generating services in an integrated broadband/telephone network and for provisioning those services in an execution environment quickly and efficiently.

It is still further desirable to provide efficient and inexpensive systems and methods for providing caller identification services.

Additional objectives, features and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

DESCRIPTION OF THE INVENTION

To achieve these and other advantages and in accordance with the purposes of the invention, as embodied and broadly described, the invention includes a videoconferencing system, comprising a broadband switch network, a plurality of video cameras, one video camera corresponding to each of a plurality of videoconferencing parties, a plurality of controllers, one controller corresponding to each video camera, a broadband session controller for communicating with each of said controllers, and a broadband service control point connected to said broadband session controller.

As embodied and broadly described, the invention also includes in a videoconferencing network including a broadband switch network, a plurality of video cameras, one video camera corresponding to each of a plurality of videoconferencing parties, a plurality of controllers, one controller corresponding to each video camera, a broadband session controller, and a broadband service control point, a method of providing videoconferencing comprising the steps of requesting at a calling party's controller, a videoconference with a called party, requesting processing instructions from said broadband service control point in response to said videoconference request, sending a videoconference session request signal to a controller associated with said called party in response to processing instructions from said broadband service control point, and establishing a broadband connection between said controllers of said calling party and said called party in response to an accept signal from said called party's controller.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the drawings:

FIG. 22 shows an example of a list of telephone-based services in accordance with one embodiment of the present invention;

FIG. 23 is an example of a call history menu in accordance with one embodiment of the present invention;

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers.

The following description of the preferred implementations of the present invention is only exemplary of the invention. The present invention is not limited to these implementations, but may be realized by other implementations.

Figure 1A:
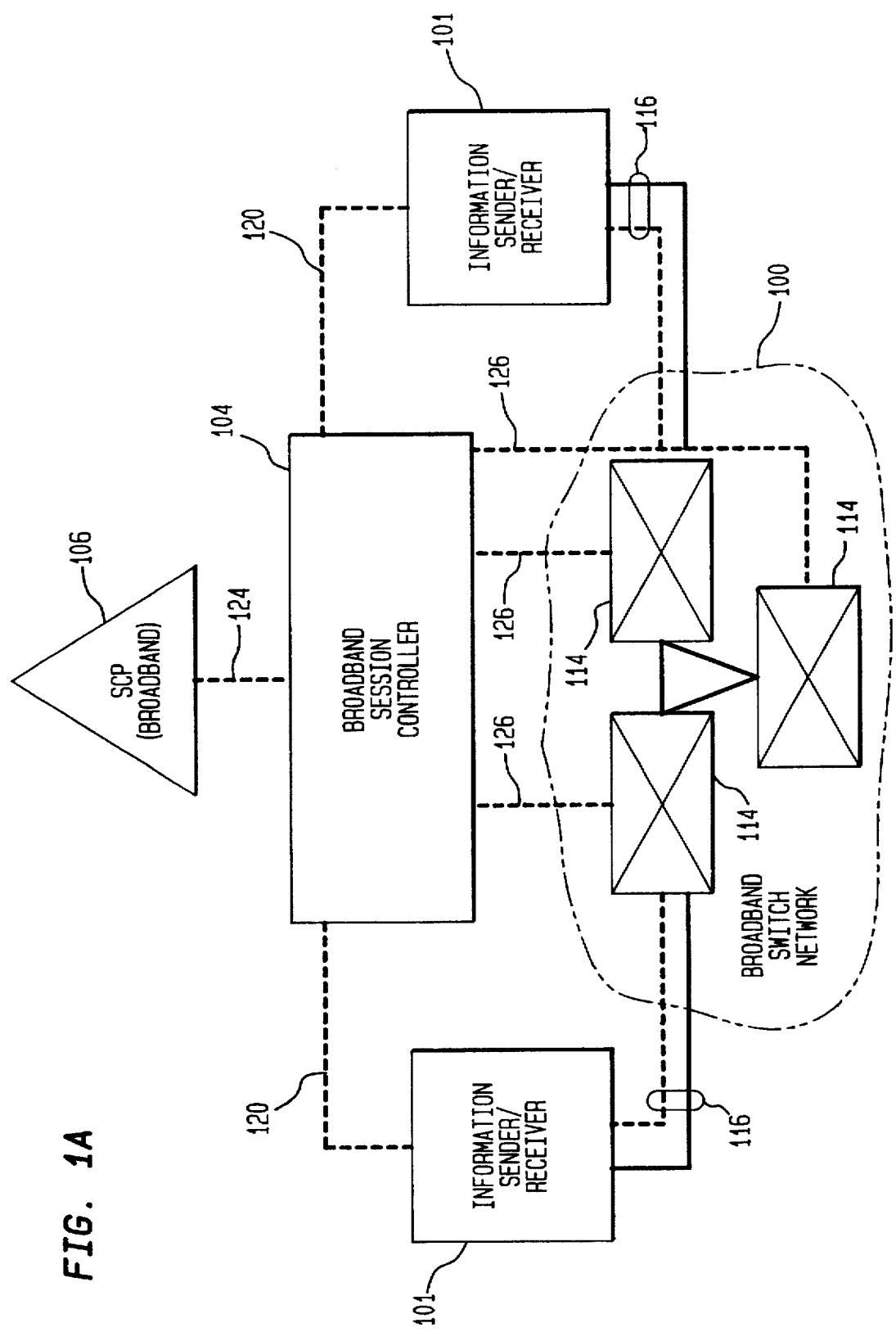
FIG. 1A is a block diagram of a broadband network in accordance with one embodiment of the present invention.

FIG. 1A is a block diagram of a broadband network in accordance with one embodiment of the present invention. As shown, the preferred broadband network includes broadband switch network ("BSN") 100, information sender/ receivers 101, broadband session controller ("BSCP") 104, and broadband service control point ("BSCP") 106.

BSN 100 preferably includes one or more broadband switches 114 for routing digital information to and from the information sender/receivers 101. Broadband switches 114 may include, for example, asynchronous transfer mode (ATM) switches or any other conventional digital information switches.

Information sender/receivers 101 preferably send and/or receive information over broadband connections 116 to the BSN 100. Broadband connections 116 may include, for example, twisted pairs of copper wires, coaxial cable, fiber optic link, or some hybrid of these.

BSC 104 communicates with information sender/ receivers 101, BSCP 100, and broadband switches 114 via data connections, 120, 124, and 126, respectively. These data connections preferably include one of twisted pairs of copper wire, coaxial cable, fiber-optic link, or some hybrid of these. Connections 120 are shown as physical connections between BSC 104 and information sender/receivers 101, respectively. In an alternative embodiment, however, these connections 120 are logical connections, with the physical data paths passing through broadband switches 114 or a separate public packet data network (not shown).

In accordance with the present invention, information sender/receivers 101 may include any type of communications equipment, computer, or network capable of sending and/or receiving control signals, data information, and/or broadband information. For example, in accordance with the present invention, information sender/receivers 101 may include customer premise equipment, personal computers, data communication hubs, information servers, video servers, cameras, monitoring equipment, telephones, other networks, etc.

Broadband session controller 104 preferably processes signals from an information sender 101 based on instructions provided by the BSCP 106. The interaction of the BSC 104 and BSCP 106 is described in detail below. Broadband session controller 104 also instructs switches 114 of the BSN 100 on when and how to route information (data and broadband) between information sender/receivers 101. Thus, in accordance with the present invention, broadband switches 114 need only limited intelligence since they preferably get routing instructions from the broadband session controller 104.

Figure 1B:
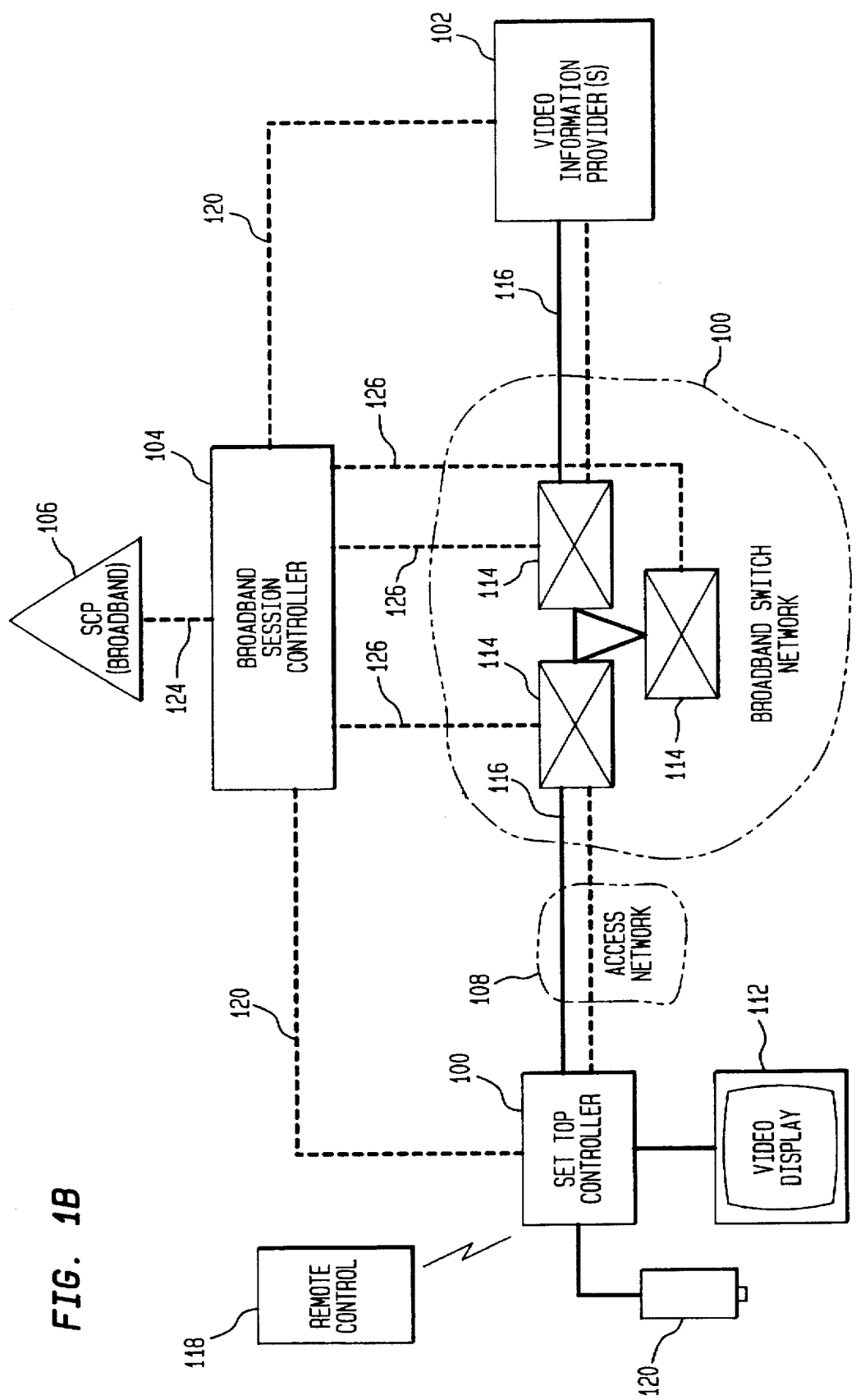
FIG. 1B is a block diagram of a broadband network for providing video information in accordance with one embodiment of the present invention.

The processing and functionality of the broadband network of the present invention will now be explained in the context of a broadband network for providing video services to a user. FIG. 1B is a block diagram of a broadband network for providing video services in accordance with one embodiment of the present invention. As shown in FIG. 1B, one of the information sender/receivers 101 comprises a settop controller 110, preferably at a remote user location. Associated with the settop controller 110 is a video display 112, video camera 120, and remote control device 118. The other information sender/receiver 101, in the video services embodiment, is replaced with one or more video information providers 102. Also, in a preferred embodiment, the communication connection 116 between settop controller 110 and the broadband switch network 100 may be provided via an access network 108. Access network 108 may comprise the same coaxial cable, fiber optic link, or some hybrid, as broadband connection 116. Alternatively, however, access network 108 may comprise ADSL technology.

In accordance with the present invention, settop controller 110 responds to input signals from a remote control device 118. These input signals include information entered by users, such as selections and data, and control the display of information on video display 112. Settop controller 110 relays these input signals to either the BSC 104 or VIP 102, depending on whether a video session with the VIP 102 has been set up and established.

Broadband session controller 104 preferably processes control signals from settop controller 110 based on instructions provided by the BSCP 106. Broadband session controller 104 also instructs switches 114 of the BSN 100 on when and how to route data between VIP 102 and settop controller 110 and instructs VIP 102 on when and how to transfer broadband video to settop controller 110.

Figure 2:
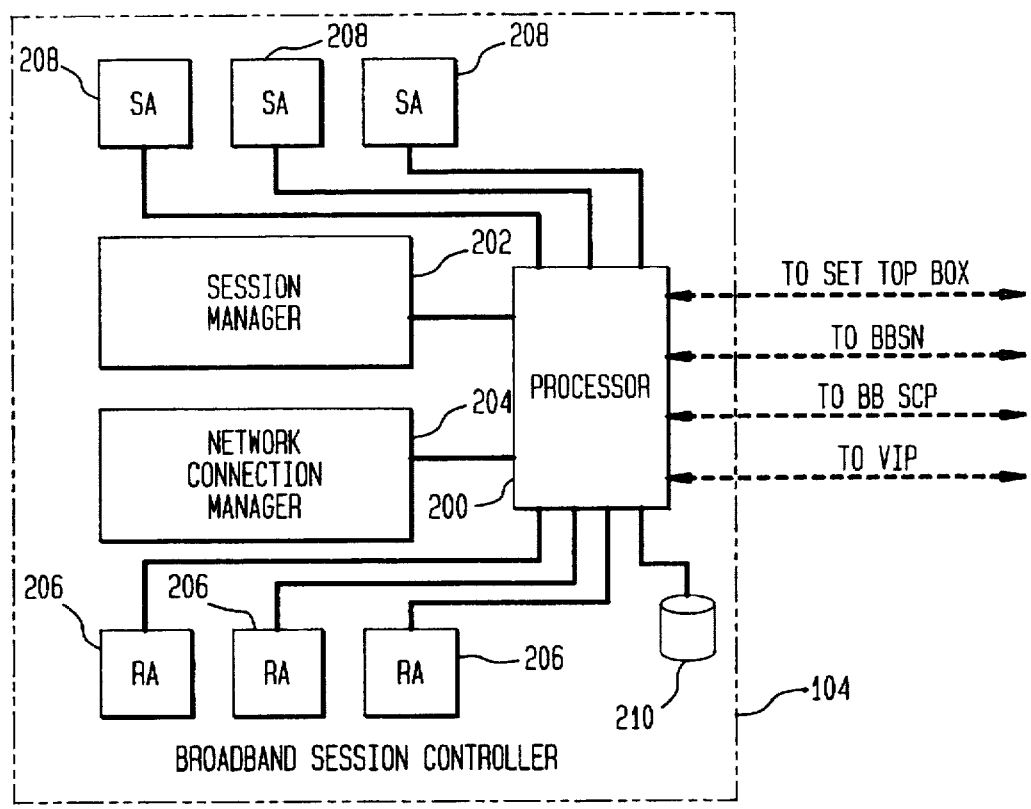
FIG. 2 is a block diagram of a broadband session controller in accordance with one embodiment of the present invention.

FIG. 2 illustrates a block diagram of the broadband session controller 104 in accordance with one embodiment of the present invention. As shown, the broadband session controller 104 preferably includes processor 200, session manager 202, network connection manager 204, one or more resource adapters 206, one or more signalling agents 208, and database 210.

Session manager 202 provides intelligence to communicate, via signaling adapters 208, with the settop controller 110 and VIP 102. Prior to establishing a new session, session manager 202 negotiates the attributes of the session with the settop controller 110 and VIP 102. Session manager 202 also interacts with the settop controller 110 and VIP 102 prior to modifying/terminating an existing session. Session manager processing includes a set of predetermined events (referred to as "triggers") which make the session manager 202 suspend current processing and query BSCP 106 for instructions on how to proceed. Thus, session manager 202 responds to "triggers" and input signals from remote control 118 to provide interactive functionality with a user.

Network connection manager 204 receives from the session manager 202 requests to allocate/modify/release network resources assigned to a particular session. Network connection manager 204 translates logical specifications of a session transport topology into requests for allocation/ deallocation of specific network resources, such as trunks, bridges and switches. For example, the network connection manager 204 determines what connections need to be made to connect a predetermined VIP 102 to the settop controller 110 for a particular user, and sends instructions to resource adapters 206 controlling the broadband switches 114 to set up those connections.

Resource adapters 206 communicate directly with broadband switches 114 and translate instructions from the broadband session controller 104 to instructions understood by a particular broadband switch 114. Thus, in a preferred embodiment, broadband session controller 104 includes a resource adapter 206 corresponding to each type of broadband switch 114 or any other network resource which is controlled by broadband session controller 104. Resource adapters 206 preferably communicate with broadband switches 114 via connections 126 (FIG. 1A). Connections 126 preferably comprise a broadband link connected to the broadband switch 114 fabric and multiplex broadband content with control information. Alternatively, a separate connection, not shown, can be provided for control information.

Signaling adapters 208 screen the session manager 202 from the need to implement multiple session signalling protocols. Signaling adapters 208 translate a session signaling protocol utilized by the settop controller 110 and VIP 102 into a generic session signaling protocol utilized by the session manager 202.

As described, in a preferred embodiment session manager 202 responds to triggers in its processing by seeking information from BSCP 106. For example, session manager 202 might respond to "power on" at the settop controller 110 by requesting information from the BSCP 106 on how to respond to that "power on" occurrence. The triggering operation of the BSC 104 may be thought of, for purposes of illustration, as analogous to triggering by a telephone switch in response to a call model trigger in an Advanced Intelligent Network ("AIN"). As explained in the incorporated patent applications, in the AIN, telephone switches respond to certain triggers from a caller by requesting call processing information from a telephone network SCP running the MSAP application and SPACE-based call processing records for each user. In a preferred embodiment, BSC 104 responds to the following triggers to provide broadband functionality.

1. Session Creation Requested. This trigger message notifies the BSCP 106 that a broadband network client, e.g. settop controller 110, has requested creation of a new broadband session. A network client is, preferably, a software module that acts as an agent of a user and interacts with the network on the user's behalf. For example, a settop controller includes a network client software module which handles video-on-demand applications and interacts with the network in this capacity. In response to this trigger, BSCP 106 may execute outgoing "screening" services. In addition, BSCP 106 may implement "call forwarding and routing" services by responding with the name and/or address of broadband client(s) to whom the session ought to be forwarded.

2. Session Change Requested. This trigger message notifies the BSCP 106 that a broadband network client has requested modifications to an existing broadband session (session which is already in progress). The requested changes may include any of the following operations:

a. adding and/or removing network clients;

b. changing the session transport topology, e.g., adding/removing transport connections between network clients which participate in the session;

c. changing the session control policies. The session control policies include session privacy policy (determines who can learn about the existence of the session through the network directory service), changes control policy (identifies the group of network clients which have permission to modify session characteristics), agreement policy (identifies the group of clients who will be involved in approval of session changes), state change notification policy (identifies the group of clients who will be notified of any session state changes), billing policy (identifies a network user(s) who will be billed for the network resources used by the session).

In response to a session change requested trigger, BSCP 106 may execute session modification screening services. For example, the BSCP 106 may validate whether the broadband client requesting changes to the session is authorized by the changes control policy currently in effect for the session. In addition, BSCP 106 may implement "call forwarding and routing" services by responding with the name and address of broadband clients to whom the session ought to be forwarded.

3. Address Information Available. This trigger message reports the session signaling address(es) of the proposed session participants. In response to this trigger, BSCP 106 may look up the session agreement policy, which is currently in effect for the session, and determine which clients ought to be queried for acceptance of the proposed session creation/change. The BSCP 106 would report to the session controller 104 the list of clients to query for acceptance.

4. Client's Responses Received. This trigger reports to BSCP 106 the client's responses to session creation/change acceptance queries. In response to this trigger, BSCP 106 may look up the session agreement policy and, based on client's responses, determine whether the session creation/modification ought to be authorized.

5. Session Action Committed. This trigger reports to BSCP 106 that broadband session controller 104 successfully performed creation/modification of the session. In response to this query, BSCP 106 may look up the state change notification policy and determine which clients ought to be notified about the session change which took place. In addition, BSCP may look up the billing policy and determine which clients ought to be billed for the session changes.

6. Session Terminated. This trigger notifies BSCP 106 that a session was terminated. It also reports to BSCP 106 the network resource usage incurred by the session. Based on this trigger, BSCP 106 could implement various billing services.

As also described in the incorporated patents and patent applications, SPACE is a graphical programming language for generating call processing records ("CPRs") using a system of graphical nodes and branches. The nodes and branches are put together by an operator or a user graphically on a computer screen and represent processing flow for handling telephone calls based on various call model triggers. Also, the MSAP program executes the CPRs to provide call processing information to telephone switches. In accordance with the present invention, the SPACE programming language is extended to provide for broadband processing.

Figure 3A:
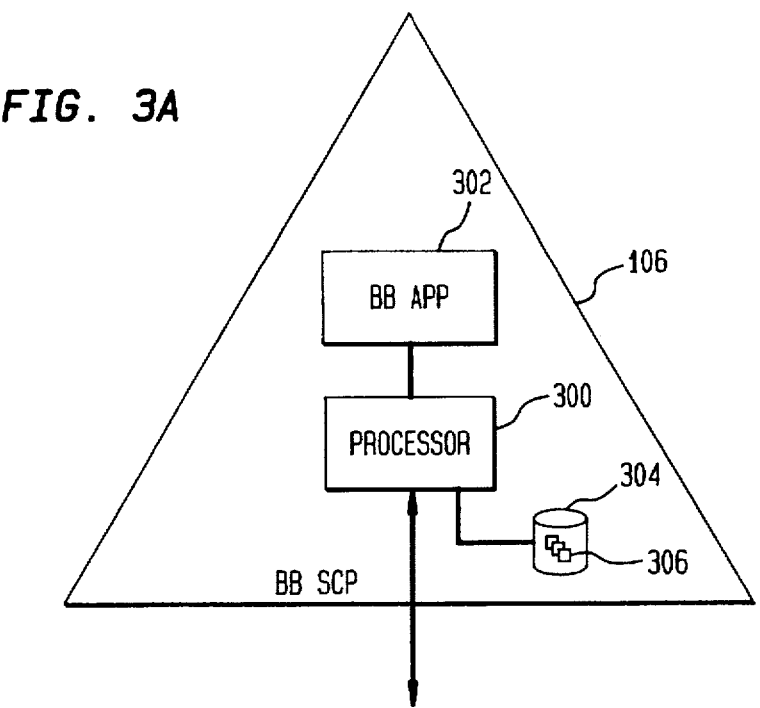
FIG. 3A is a block diagram of a broadband service control point in accordance with one embodiment of the present invention.

As shown in FIG. 3A, in accordance with the present invention, BSCP 106 includes a processor 300, a broadband application 302, and a database 304 containing a plurality of user broadband processing records ("BPRs") 306. Broadband application 302 preferably includes the broadband extended SPACE programming and execution language.

Broadband database 304 includes one or more BPRs 306 for each user. In response to triggers from the broadband session controller 104, BSCP 106 refers to a BPR 306 for that user, executes that BPR to obtain processing information, and returns processing instructions to the broadband session controller 104. The broadband session controller 104 preferably responds to processing instructions from the BSCP 106 by instructing either the settop controller 110, the broadband switches 114, or the VIP 102. Details of these instructions are described below.

Figure 3B:
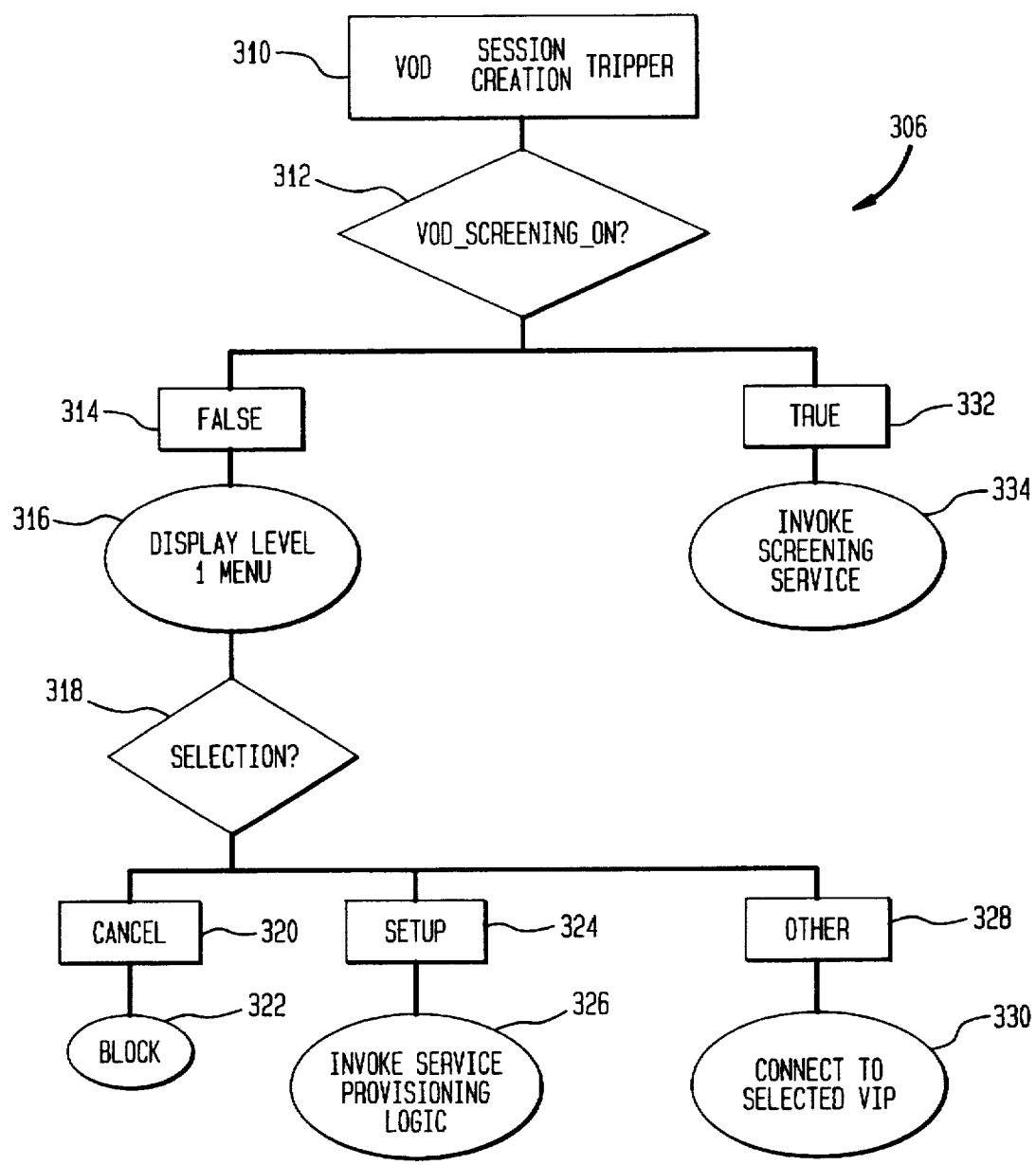
FIGS. 3B and 3C are examples of a broadband processing record in accordance with one embodiment of the present invention.
Figure 3C:
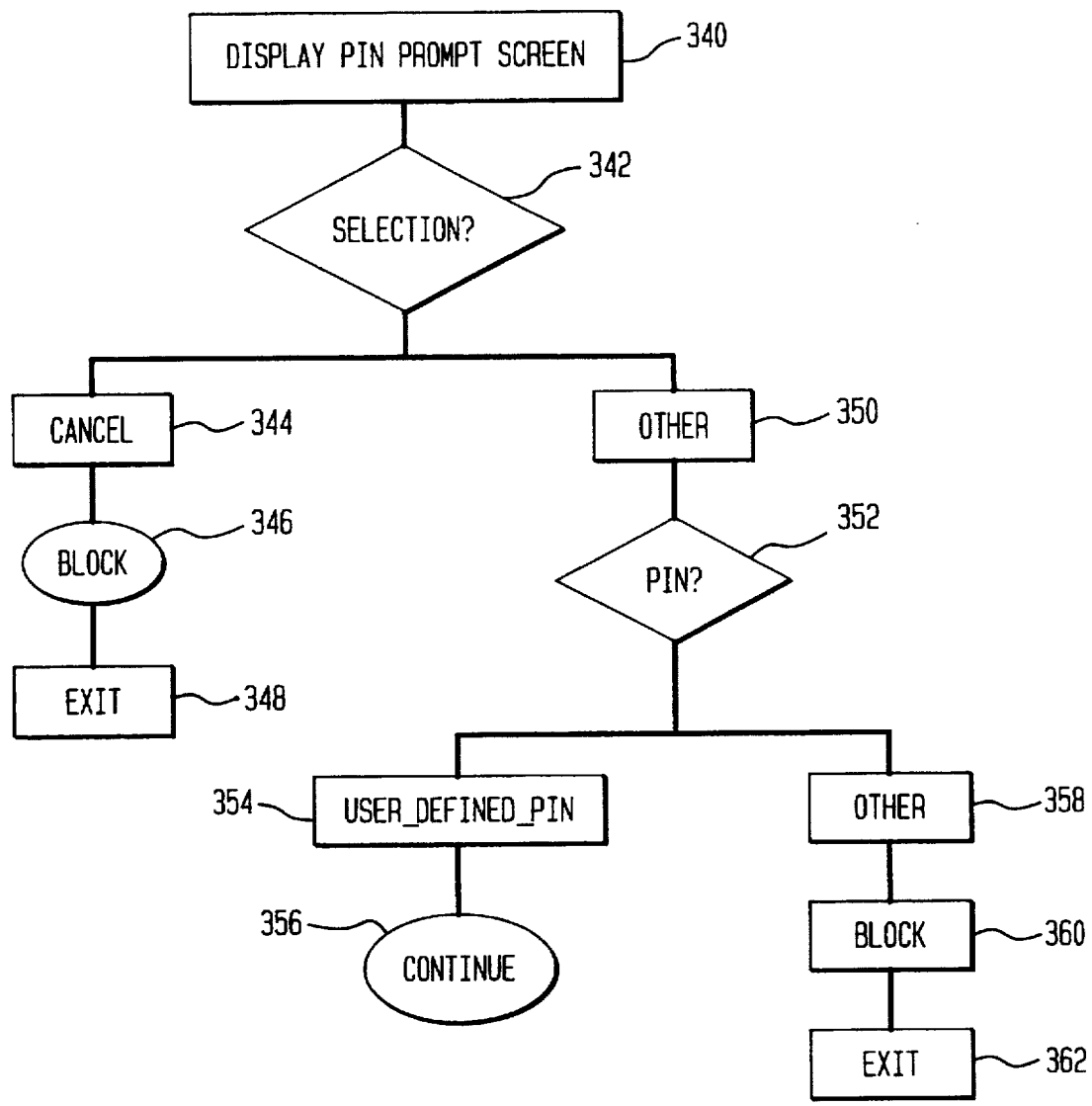

FIGS. 3B and 3C illustrate the processing flow of an exemplary BPR 306 in accordance with one embodiment of the present invention. Initially, BPR 306 responds to a video-on-demand ("VOD") session creation trigger (node 310) and determines whether the user has activated screening capabilities (node 312). If the user is not screening his/her VOD service (false branch 314), BPR 306 instructs the settop controller 110 to display a level one gateway ("L1GW") menu (node 316). The L1GW menu is described in more detail below. BPR 306 then identifies a L1GW menu selection made by a user (node 318). If the selection cancels the session (branch 320), BPR 306 requests session manager 202 to cancel the establishment of the VOD session (node 322). If the selection requests VOD service setup (branch 324), BPR 306 invokes service provisioning logic (node 326). The service provisioning logic allows a user to modify the characteristics of the VOD service, e.g. turn on/off the VOD access screening. In response to any other selection (branch 328), BPR 306 instructs BSC 104 to connect the user to the selected VIP 102 (node 330).

If the user uses VOD screening (branch 332), BPR 306 invokes the screening service processing (node 334). The screening service processing is shown, for example, in FIG. 3C. To provide VOD screening, the BPR requests the settop controller 110 to display a PIN prompt screen (node 340). The user then makes a selection (node 342). If the user selects to cancel the session (branch 344), BPR 306 blocks the session (node 346) and exits the routine (node 348). For any other user selection (branch 350), BPR 306 evaluates the PIN entered by a user (node 352). If the PIN entered by the user matches a predefined PIN (branch 354), the processing continues, as shown generally by node 356. If, instead, the user has not input a matching PIN (branch 358), BPR 306 blocks the processing and exits the routine (nodes 360 and 362, respectively).

Referring again to FIG. 2, BSC 104 also includes a database 210 that preferably stores data or information to be sent to the settop controller 110. For some triggers, broadband session controller 104 need not go to the BSCP 106 for information on how to respond. Instead, session manager 202 may provide responsive information from the database 210. For example, when a settop controller 110 goes off hook, session manager 202 may initially transfer interface graphics from database 210 to the settop controller 110. Alternatively, even if the session manager 202 does go to the broadband BSCP 106 for information on responding to the trigger, BSCP 106 may instruct the session manager 202 to respond with information from the database 210 in the broadband session controller 104.

As shown in FIG. 2, broadband session controller 104 includes a single session manager 202. However, in accordance with the invention, broadband session controller 104 may include more than one session manager 202. Preferably, a session manager 202 is provided for each broadband application or service provided by the system shown in FIG. 1A. For example, one session manager may manage VOD services, while a second session manager, including a set of different triggers, manages videoconferencing services. Videoconferencing services are described in more detail below.

In accordance with the present invention, network connection manager 204 also includes a set of triggers which make it query BSCP 106 for instructions. Specifically, while allocating physical network resources to a session, network connection manager 204 may request BSCP 106 to grant permission to use a particular resource. For example, some network resources, e.g. trunks, may be reserved for exclusive use by certain network users, such as the U.S. government. Whenever the connection manager 204 attempts to allocate these reserved resources to a particular session, a trigger condition will make the network connection manager 204 request BSCP 106 to authorize the resource allocation.

Session manager 202, network connection manager 204, resource adapters 206, and signaling adapters 208 preferably comprise software or microcode, which is executed by processor 200, and any hardware necessary to effect the execution of that software or microcode in accordance with conventional techniques. Processor 200 comprises any conventional processor or computer capable of executing the software or microcode and performing the functions described in connection with these components. In an alternative embodiment, however, these components of broadband session controller 104 can be implemented in electronic logic circuitry.

Figure 4:
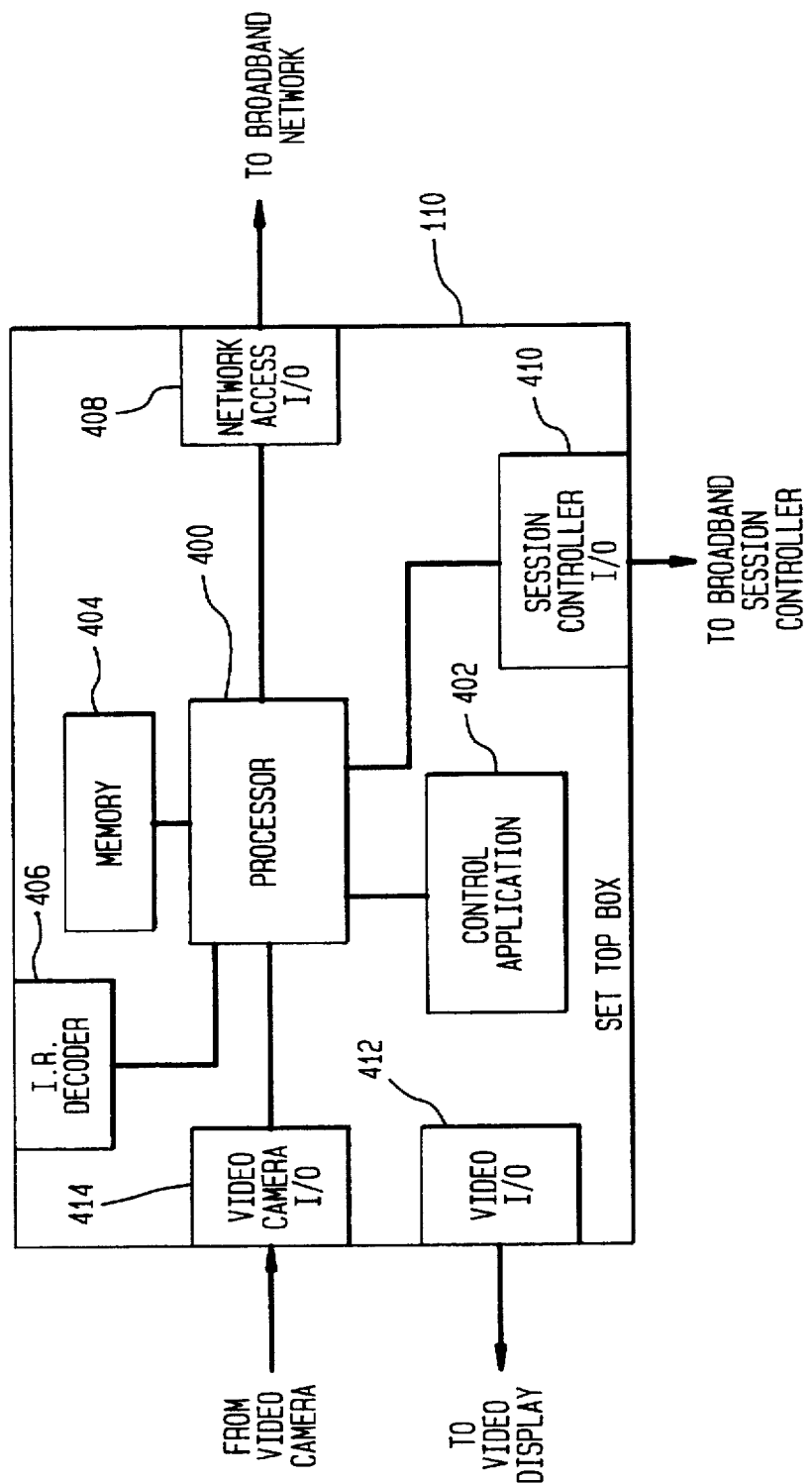
FIG. 4 is a block diagram of a settop controller in accordance with one embodiment of the present invention.

FIG. 4 illustrates a block diagram of a settop controller 110 in accordance with one embodiment of the present invention. As shown, settop controller 110 preferably includes a processor 400 and control applications 402 for controlling signalling and broadband contents information flow between the broadband session controller 104, the video display 110, and the BSN 100. In addition, settop controller 110 preferably includes memory 404 to store and buffer data and video information.

Settop controller 110 also includes an IR decoder 406 for decoding input signals sent to the settop controller 110 by remote control 118. Network access I/O 408 provides input/output control of information to and from the broadband switch network 100. Session controller I/O provides control of signaling information to and from the broadband session controller 104. Video I/O 412 provides control of video information to and from the video display 112. Finally, video camera I/O 414 provides control of video information from a video camera 120.

Figure 5:
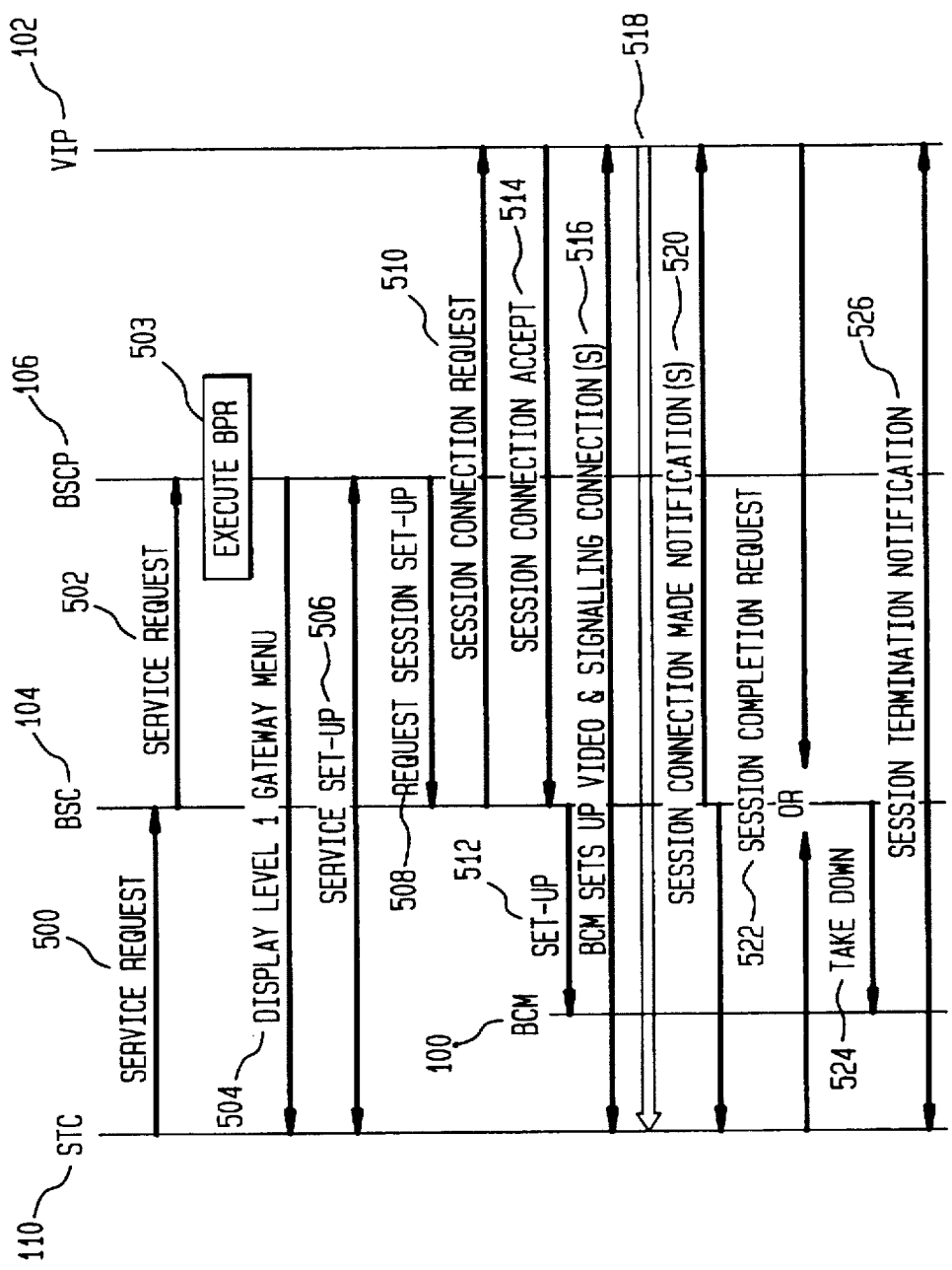
FIG. 5 is a process flow diagram for a video-on-demand service in accordance with one embodiment of the present invention.

FIG. 5 illustrates a process flow diagram for the broadband network of FIG. 1B for providing VOD services in accordance with one embodiment of the present invention.

Initially, in response to a user input signal from remote control 118, settop controller 110 transmits a service request instruction to the BSC 104 (step 500). Session manager 202 of BSC 104 issues the service request to the BSCP 106 (step 502). In response to the service request, BSCP 106 executes a BPR for the user (step 503). In the embodiment of FIG. 5, the BPR for the user instructs the settop controller to display a L1GW menu and sends the L1GW menu choices to the settop controller 110 through the BSC 104.

Figure 6:
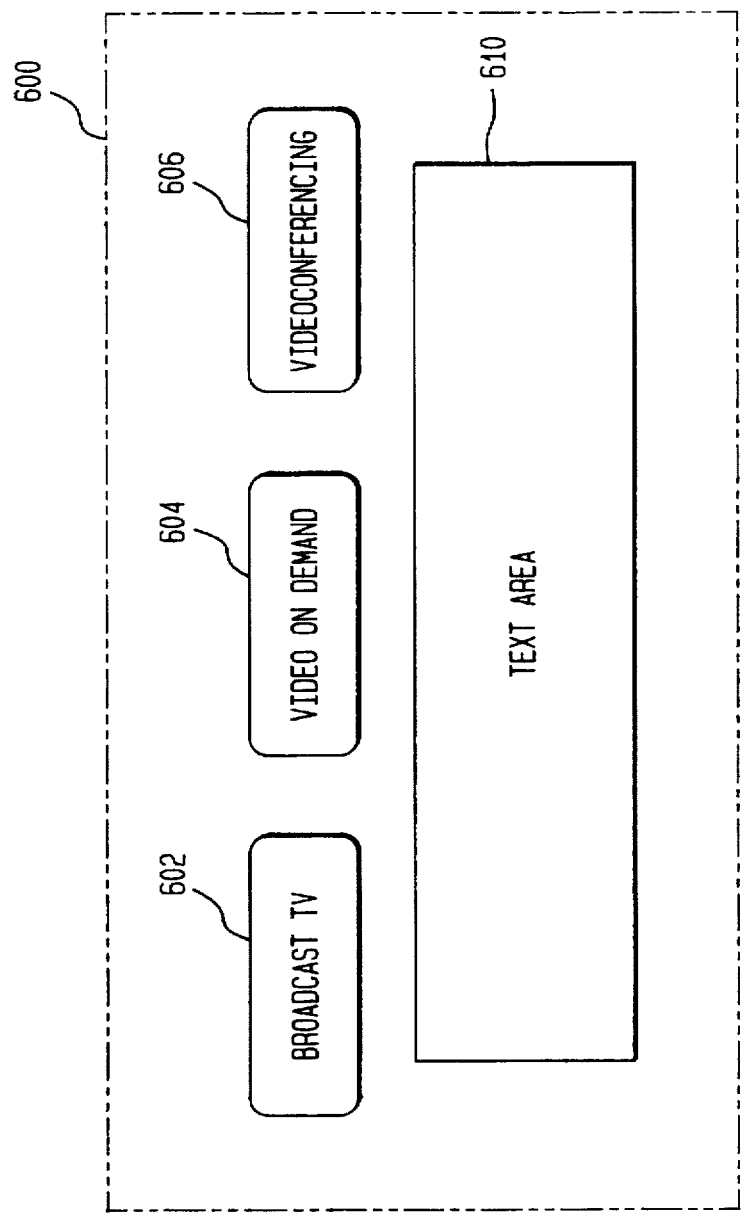
FIG. 6 is an example of a level one gateway menu in accordance with one embodiment of the present invention.

FIG. 6 illustrates an example of a L1GW menu 600. The L1GW menu 600 preferably includes selection buttons for various services provided by the broadband network. The service buttons may include conventional broadcast TV 602, VOD 604, or videoconferencing 606. Videoconferencing is discussed in more detail below. In addition, the L1GW menu 600 may include a text area 610 to provide information to the user as needed.

Referring again to FIG. 5, through a series of interactions between the user and the settop box, the BSCP 106 provides service setup (step 506), as follows. The user selects the VOD button 604 from the L1GW menu 600 and the BSCP 106 responds by requesting a user's personal identification number ("PIN").

Figure 7:
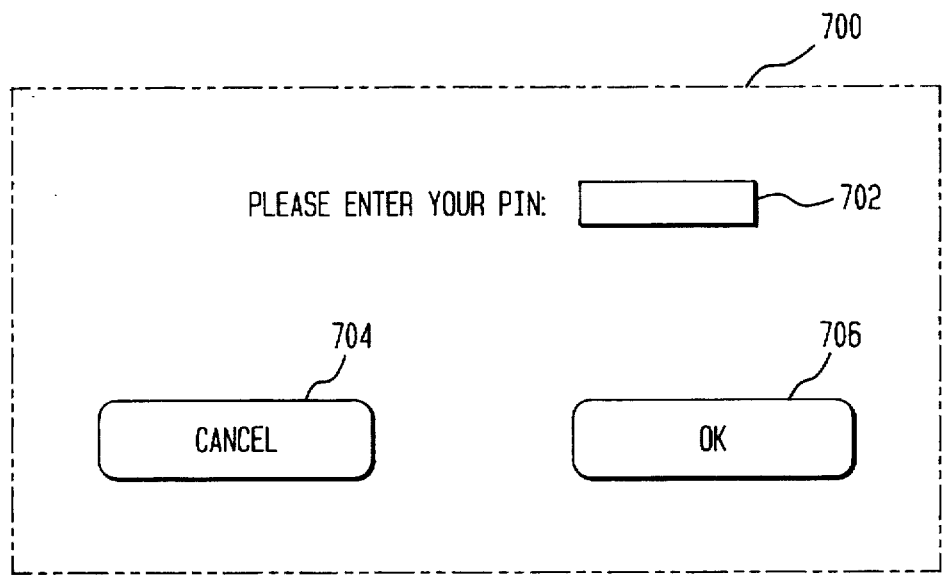
FIG. 7 is an example of a display menu for requesting a user's PIN in accordance with one embodiment of the present invention.
Figure 8:
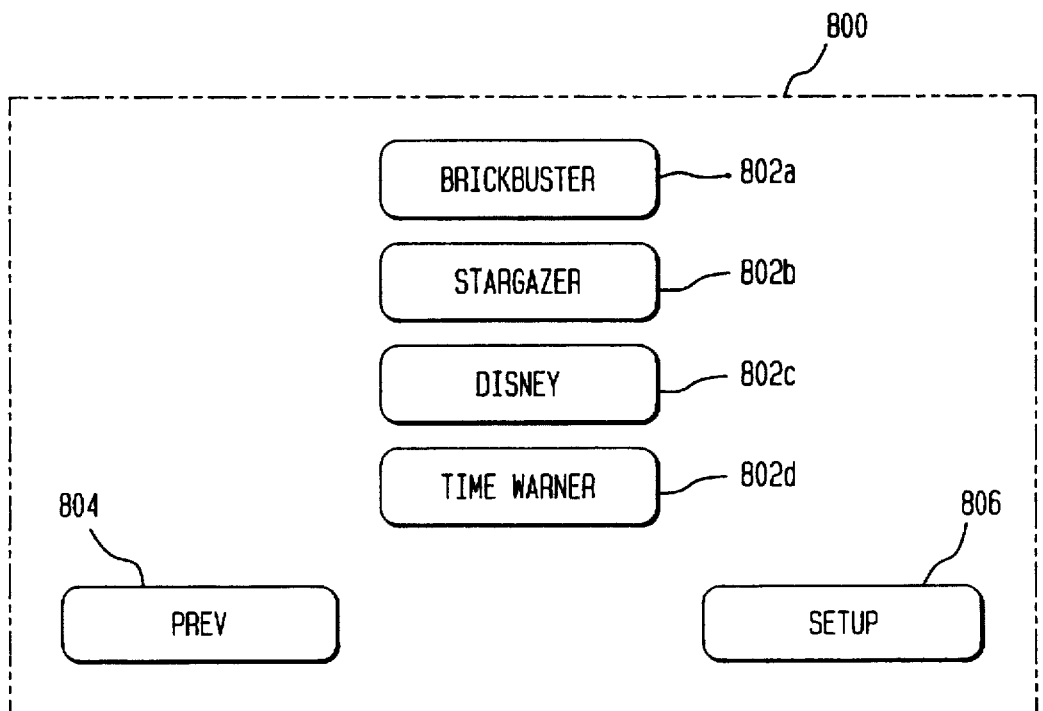
FIG. 8 is an example of a video selection menu for a video information provider in accordance with one embodiment of the present invention.

FIG. 7 illustrates an exemplary display menu for requesting the user's PIN. As shown, the PIN display menu 700 includes a field displaying the text "PLEASE ENTER YOUR PIN:" (field 702), as well as a "cancel" button (704) and "okay" button (706). The user enters a predefined PIN number and selects the "okay" button 706. In response, BSCP 106 displays a VIP menu display 800, as shown for example in FIG. 8. The video selection panel 800 includes selection buttons 800(a)–(d) corresponding to various VIPs offering VOD services in the network. The VIP selection menu may also include a preview button 804 to provide preview information for each VIP server, as well as a setup button 806 to establish a connection with the VIP server.

Referring again to FIG. 5, when the user selects a VIP button 802, the BSCP 106 sends a request session setup instruction to the BSC 104 (step 508). Session manager 202 then sends a session connection request to the VIP 102 selected by the user (step 510). After receiving a session connection accept or acknowledgment signal from the VIP (step 514), BSC 104 sends setup instructions to the BSN 100 (step 512). BSN 100 sets up the video and signaling connections between the settop controller 110 and the VIP 102 (step 516). BSC 104 notifies VIP 102 and settop controller 110 that the connections were established (step 520). VIP 102 then begins pumping proprietary interface menus, such as video selection menus, down a broadband connection 518 to the settop controller 110.

Figure 9:
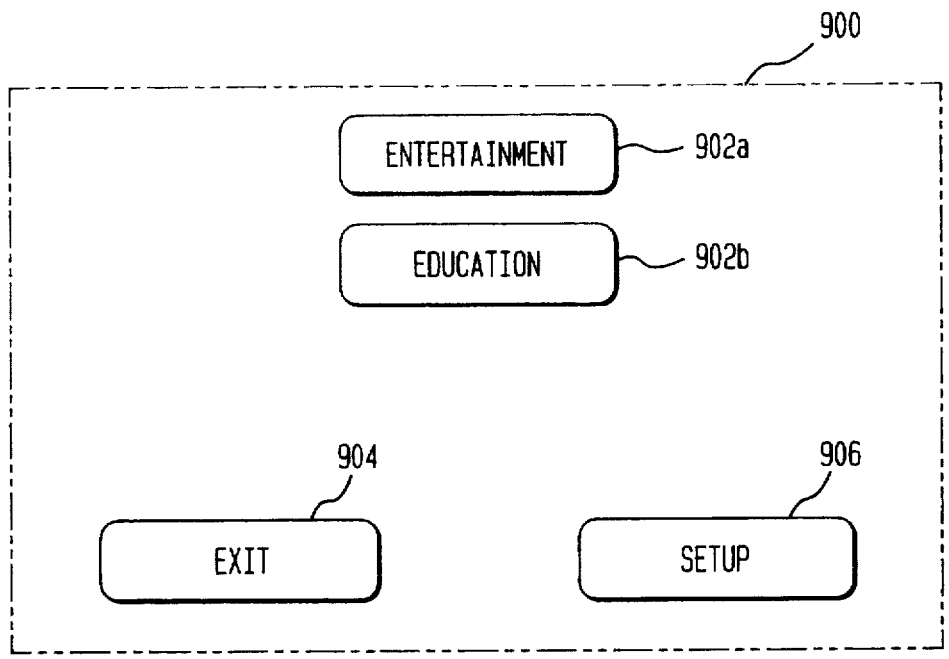
FIG. 9 illustrates an exemplary selection menu provided by a video information provider in accordance with one embodiment of the present invention.

FIG. 9 illustrates an exemplary video selection menu 900 provided by a VIP 102. The video selection menu 900 may include a selection of video category buttons 902A and 902B, as well as exit (904) and setup (906) buttons. Although FIG. 9 shows the video selections based on only two criteria, entertainment (902a) and education (902b), the video selection can be provided based on many categories, such as any category found in video rental stores.

Figure 10:
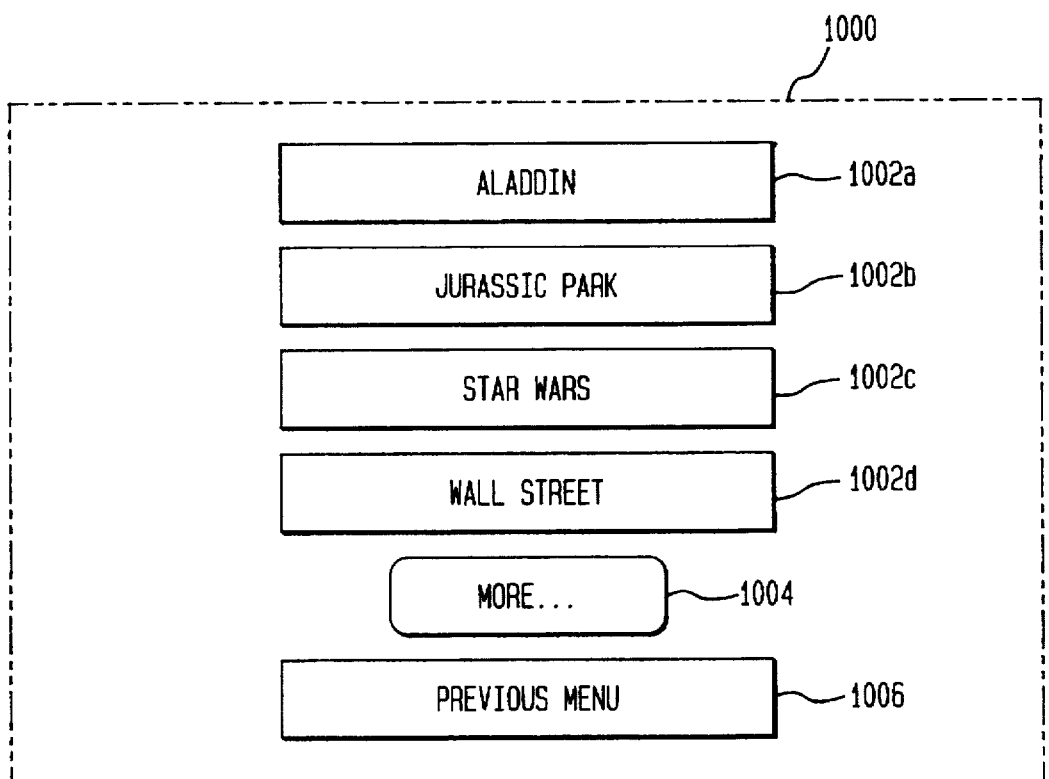
FIG. 10 illustrates another exemplary selection menu provided by a video information provider in accordance with one embodiment of the present invention.

In response to a user's selection of a category 902 and setup button 906, the VIP 102 might respond by displaying a menu listing movies in that particular category. FIG. 10 shows an exemplary menu 1000, which includes a listing of video titles 1002(a)–1002(d), as well as a "more" button 1004 and a "previous menu" button 1006. A user selects the movie title and the VIP 102 begins sending the video signal to the settop controller 110 for display on the user's video display 112.

Returning again to FIG. 5, a VOD session may end in response to a session completion request from either the VIP 102 or the user through the settop controller 110 (step 522). In response to such a session completion request, the network connection manager 204, through the RAs 206, instructs the broadband switching network 100 to take down the broadband connection to the VIP (step 524). Once the connection is terminated, the session manager sends a session termination notification signal to both the VIP 102 and the settop controller 110 (step 526), thus ending the system operation.

Figure 11:
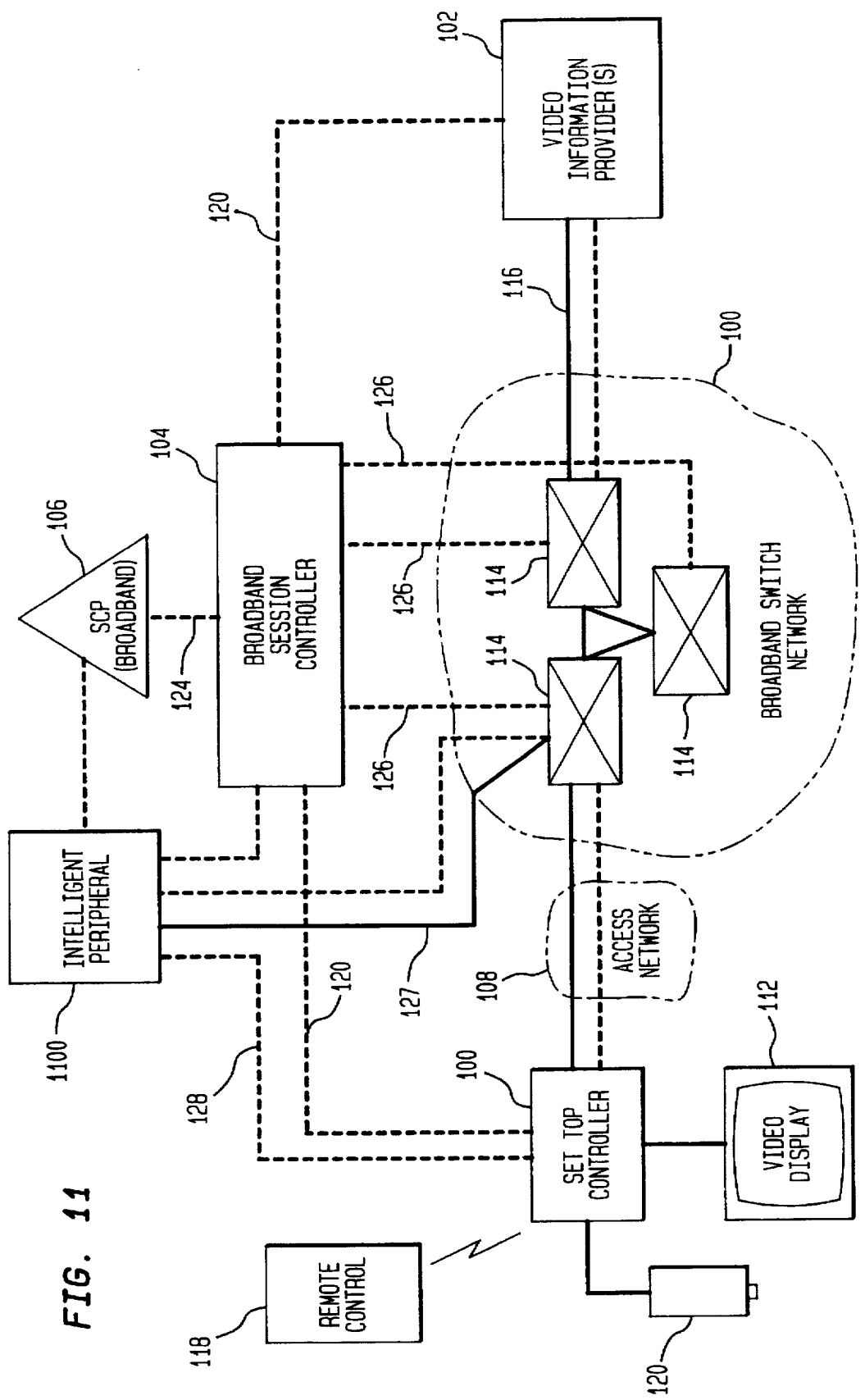
FIG. 11 is a block diagram of a broadband network in accordance with an alternative embodiment of the present invention.

In an alternative embodiment, a broadband network according to the present invention includes an intelligent peripheral ("IP") for providing certain system functionality. As shown in FIG. 11, this alternative network remains essentially the same as the network shown in FIGS. 1A and 1B, however, an IP 1100 is connected to BSCP 106, BSC 104, an information sender/receiver 101 (in the case of FIG. 11, settop controller 110), and one or more switches 114 of the BSN 100.

In the embodiment of FIG. 11, IP 1100 preferably replaces low level operations associated with the settop controller 110 in the previous embodiment. In this embodiment, BSCP 106 preferably sends signaling information to IP 1100 requesting IP 1100 to generate video representation of the VOD menu screens and send it to the settop controller 110 via transport connections in broadband switch network 100 and access network 108. Thus, in this embodiment, IP 1100 off-loads the settop controller from generating video representations of the VOD menu screens. IP 1100 preferably comprises a Bellcore Intelligent Services Peripheral modified to provide the disclosed broadband network functionalities. Connections 120, 122, and 128 shown in FIG. 11 may be logical connections, with the physical connections passing instead through switches 114.

Figure 12:
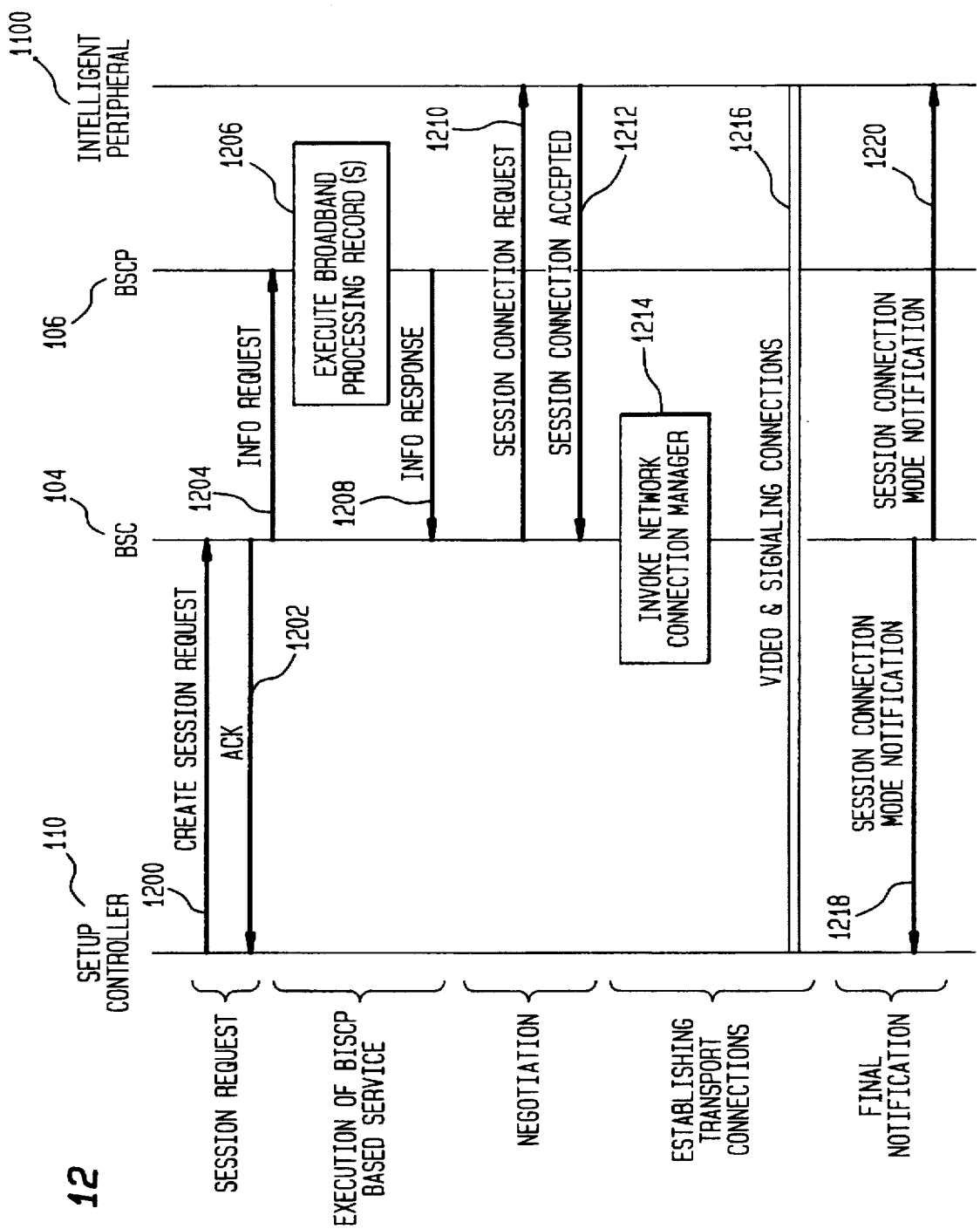
FIGS. 12–14 illustrate alternative system setup and processing flow operations in accordance with an alternative embodiment of the present invention.

FIG. 12 illustrates a system setup and processing operation for connecting a user with the IP 1100 to provide VOD services. Initially, the user creates a session request through IR decoder 404, which is sent from the settop controller 110 to BSC 104 (step 1200). BSC 106 returns an acknowledge signal (step 1202) and sends an information request signal to the BSCP 106 (step 1204). The BSCP 106 executes a BPR (step 1206) and returns an information response to the session manager 202 of the broadband session controller 104 (step 1208). The response message (step 1208) directs broadband session controller to establish signaling and video connections between the IP and settop controller 110. Session manager 202 then requests a signaling adapter module 208 to send a session connection request to the IP (step 1210). The IP 1100 responds to this signal by sending a session action accepted signal to the broadband session controller 104 (step 1212). In response to the session action accepted signal, session manager 202 invokes network connection manager 204 (step 1214). Network connection manager 204, via resource adapter 206, establishes the signaling data and video connections between settop controller 110 and IP 1100. In particular, resource adapters 206 associated with access network 108 and broadband switches 114 set up the signaling, video, and audio transport connections between IP 1100 and settop controller 110 (connection 1216). After the transport connections are established, session manager 202 then sends session connections mode notifications to both the settop controller 110 and the IP 1100 so that the IP 1100 and settop controller 110 know when to start using the connection.

Figure 13:
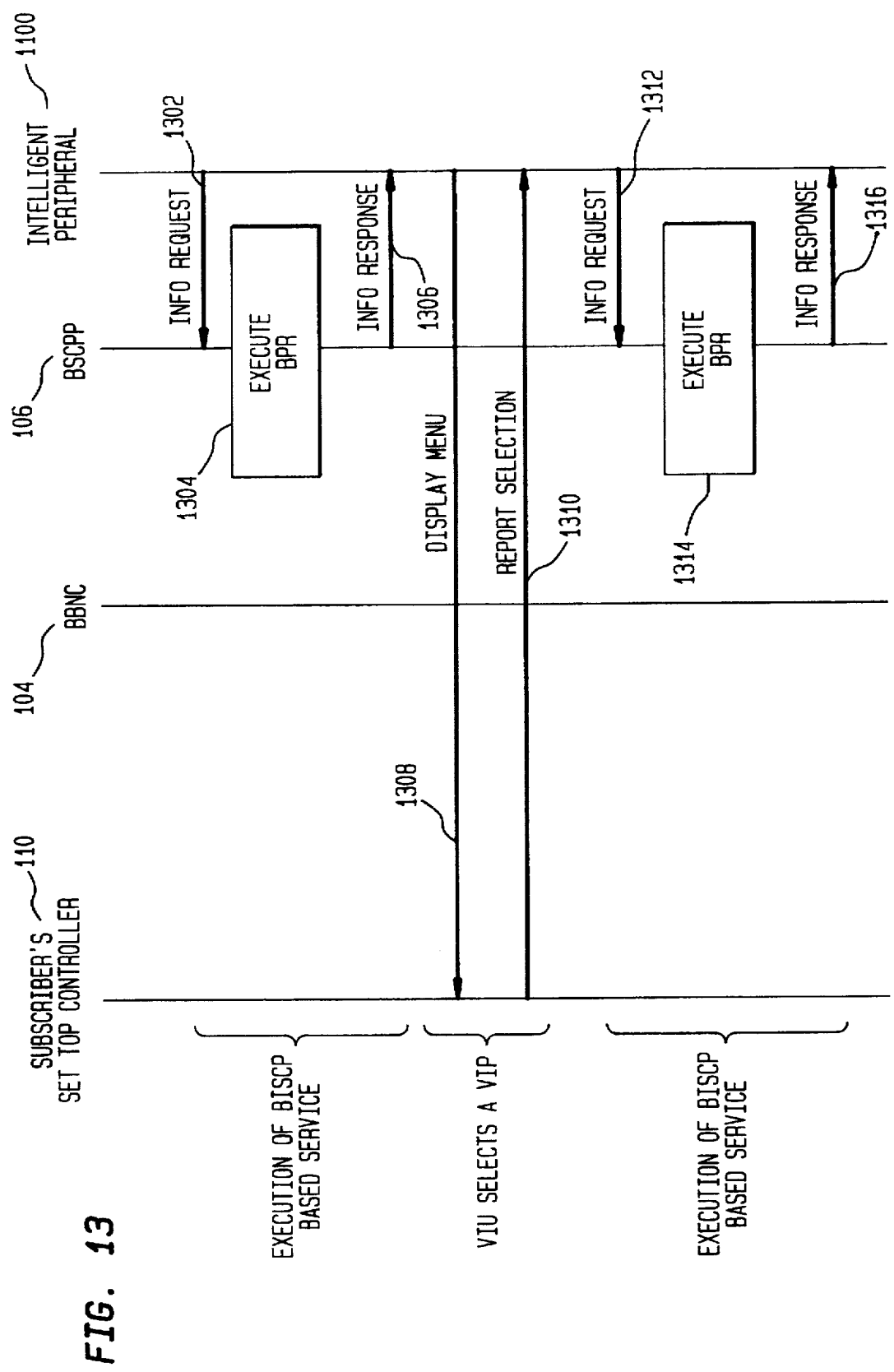

The IP 1100 can now communicate with the user directly to provide service functionality as described above. For example, as shown in FIG. 13, in this alternative embodiment, once the IP 1100 and the user's settop controller 110 are connected, the IP 1100 processing may take over and request information from BSCP 106 to provide VOD services for the user (step 1302). In response to this request, the BSCP 106 will again execute a BPR (step 1304) and provide response information to the IP 1100 (step 1306). In this example, the information from the BSCP 106 instructs the IP 1100 to display VOD menu information (step 1308) (i.e. upon receiving this information, the IP 1100 generates a video representation of the menu and sends it to settop controller 110). The user's settop controller then returns selection information to IP 1100 (step 1310). In response, the IP 1100 again sends an information request to BSCP 106 (step 1312). BSCP 106 again executes a BPR responsive to that information request (step 1314) and returns another response to IP 1100 (step 1316). This communication between IP 1100 and BSCP 106 and IP 1100 and settop controller 110 continues until BSCP 106 has all information necessary to connect the user's settop controller 110 to the VIP 102. At this point (step 1316), BSCP 106 instructs IP 1100 to request a connection between the user's settop controller 110 and VIP 102.

Figure 14:
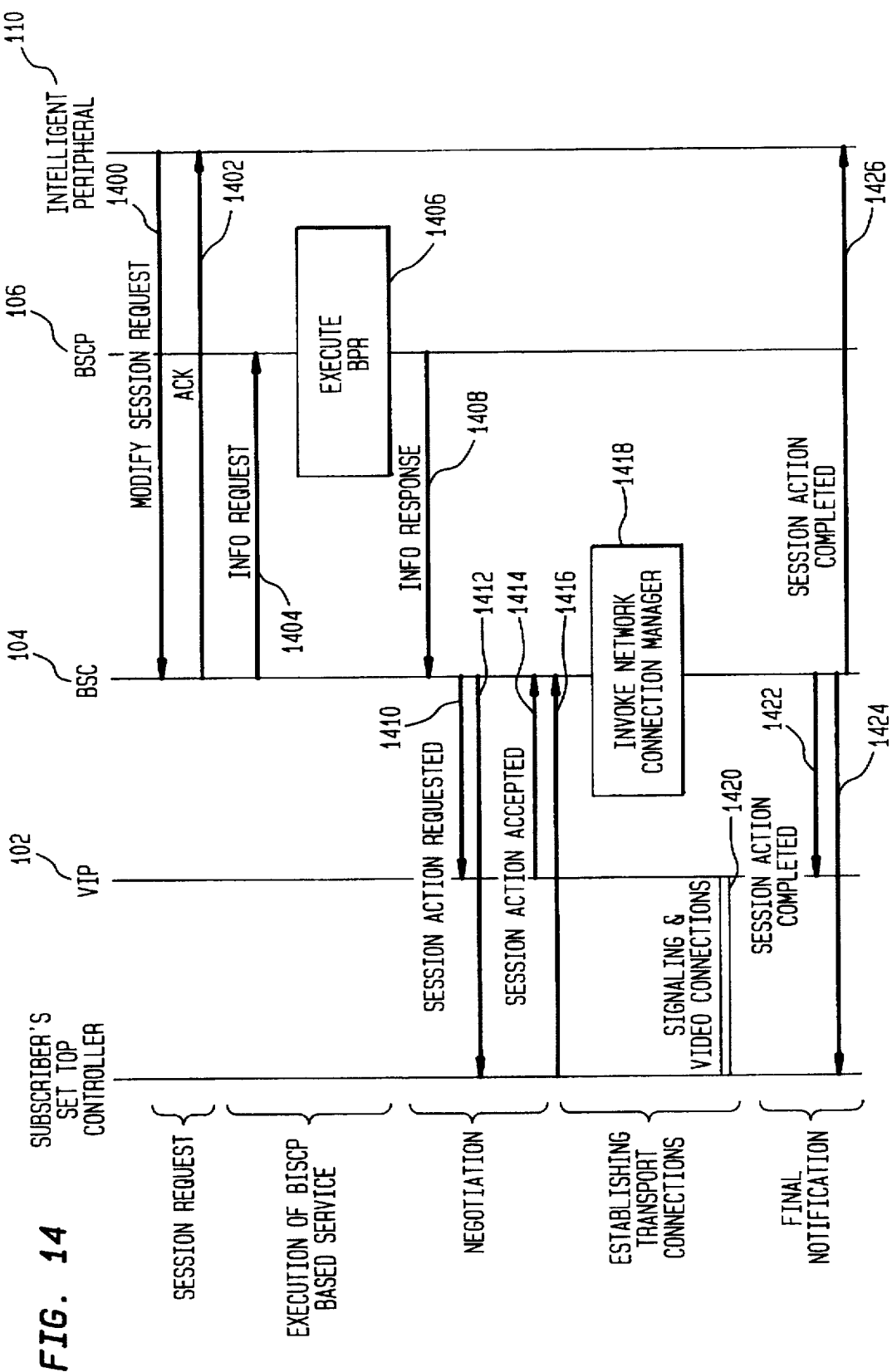

FIG. 14 shows the processing steps for connecting the user's settop controller 110 to the VIP 102 in this alternative embodiment. Initially, the IP 1100 requests the broadband session controller 104 to modify the existing session between the settop controller 110 and IP 1100. The requested session modification includes removal of signaling and video connections between settop controller 110 and IP 1100 and establishment of signaling and video connections between settop controller 110 and VIP 102. Specifically, IP 1100 sends a modify session request to BSC 104 (step 1400), and the BSC 104 returns an acknowledgment signal to the IP 1100 (step 1402). The BSC 104 then requests information from the BSCP 106 (step 1404), which executes a BPR to determine how to handle the request (step 1406) and returns responsive information to the BSC 104 (step 1408). The session manager 202 of BSC 104 then negotiates with the user's settop controller 110 and the VIP 102 by sending session action requests (steps 1410 and 1412, respectively), and receiving session action accepted signals (steps 1414 and 1416, respectively). In response to session action accepted signals from the settop controller 110 and the VIP 102, session manager 202 invokes the network connection manager 204 to set up the network connections (step 1418). The connection manager 204 calls the appropriate resource adapters 206 to connect the settop controller 110 to the VIP 102 through the access network 108 and BSN 100 (signaling and video connections 1420). BSC 104 then sends session action complete signals for final notification to VIP (step 1422), settop controller (step 1424), and IP 1100 (step 1426).

The present invention also provides for broadband videoconferencing. The general operation of the network is similar to that for VOD services as described above, except that for broadband videoconferencing, the video source comes not from a VIP, but from the video camera 120 associated with a user's settop controller 110. Preferably, for videoconferencing, settop controller 110 controls cameras 120, microphones (not shown), video display 112, and speakers (not shown).

Figure 15:
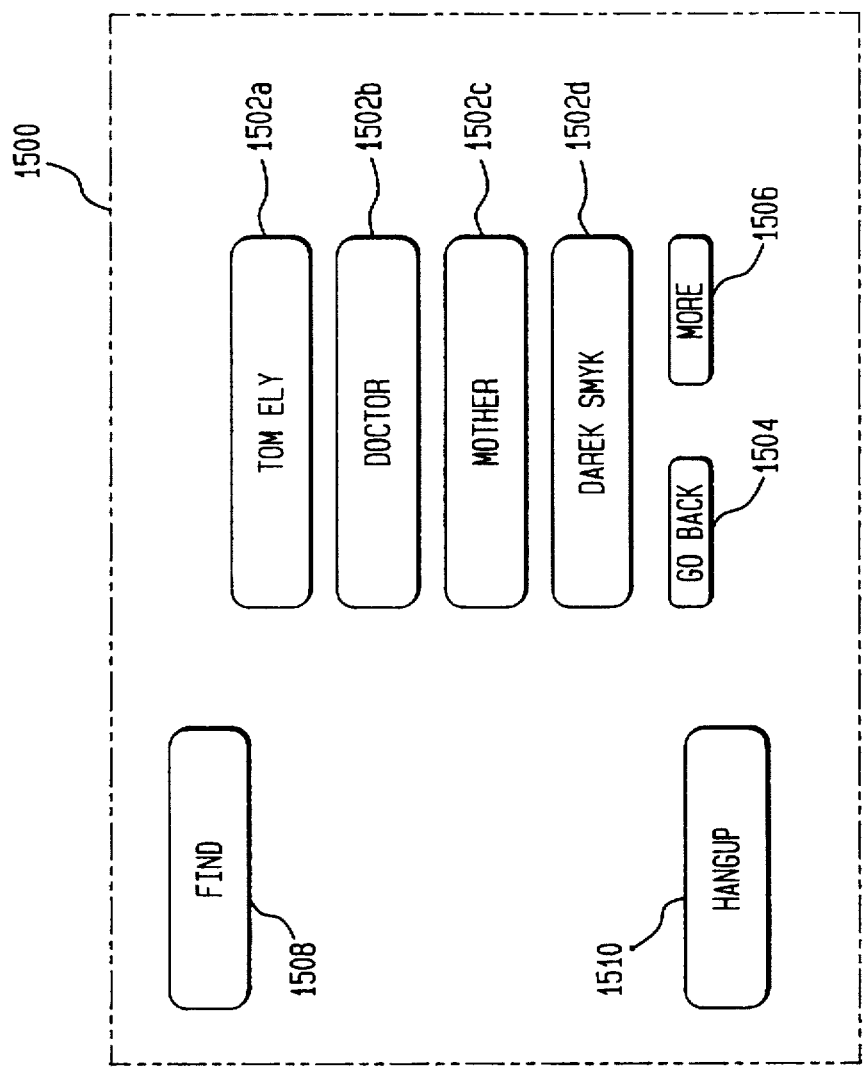
FIG. 15 illustrates a display menu for a videoconferencing service in accordance with one embodiment of the present invention.

The videoconferencing service is preferably selected using the videoconferencing button 606 off the LIGW menu 600, shown in FIG. 6. In response to the selection of the videoconferencing service, the BSCP 106 preferably transfers a videoconferencing menu to the caller's settop controller 102. A preferred videoconferencing menu 1500 is shown, for example, in FIG. 15. The videoconferencing menu 1500 preferably includes a personal list of names of individuals or businesses 1502(a)–1502(d) that the caller includes within the caller's videoconferencing services.

Videoconferencing menu 1500 may also include "go back" 1504, "more," 1506, "find," 1508 and "hang up" 1510 buttons. "Go back" button 1504 displays the main menu shown in FIG. 6. The "find" button 1508 determines the address of any videoconferencing subscriber. In response to the selection of the "find" button 1508, settop controller 110 displays a screen prompting the caller for information about a videoconferencing subscriber whose address is needed. In response to the selection of the "more" button 1506, the settop controller 110 displays another portion of the caller's personal list of names of individuals or businesses 1502(a) –1502(d) that the caller often calls via videoconferencing services. In response to the selection of "hang up" button 1504, the settop controller 110 requests termination of the existing videoconferencing session between the settop controller 110 and videoconferencing network client(s) utilized by other videoconferencing user(s) engaged in the current videoconferencing session.

Figure 16:
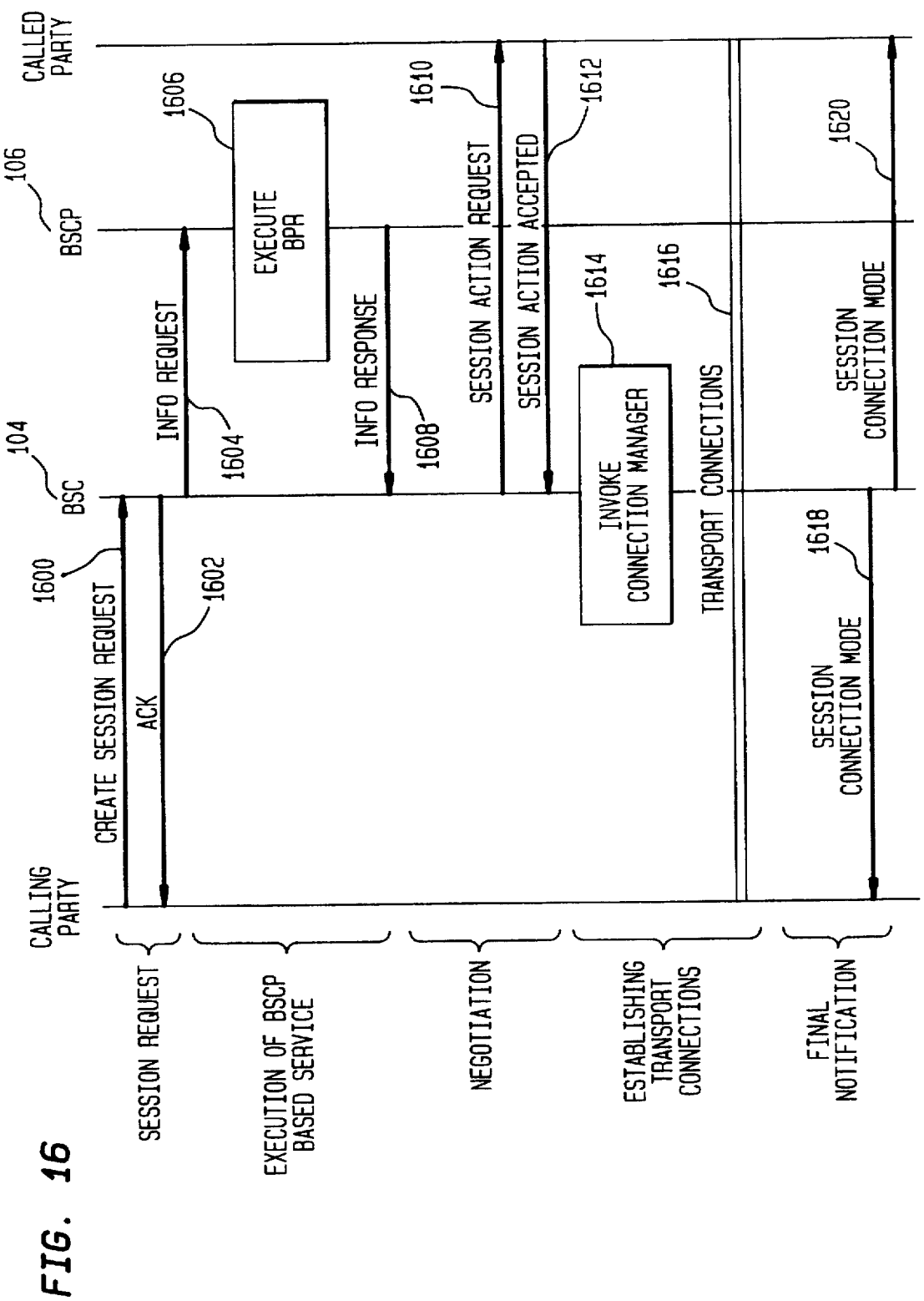
FIG. 16 is a processing flow diagram for providing a videoconferencing service in accordance with one embodiment of the present invention.

FIG. 16 shows the processing steps for providing a videoconferencing service in accordance with one embodiment of the present invention. As discussed, for videoconferencing, the setup steps 1600–1608 between a caller's settop controller and BSC 104 and the communication between BSC 104 and BSCP 106 are the same as step 1200–1208 shown in FIG. 12 for VOD services, except that the user has selected the videoconferencing service button 606 off the LIGW menu 600. In response to the information request message (step 1604), BSCP 106 preferably executes broadband processing record BPR (step 1606) which, like the exemplary BPR shown in FIGS. 3B–3C, may implement services offered to videoconferencing users, e.g. "call screening" services, "call forwarding and routing" services, etc. In this embodiment, in response to information from BSCP 106, session manager 202 of BSC 104, through a signaling adapter 208, sends a session action request signal to a settop controller 110 of a called party to inform the called party of the attempted videoconference (step 1610). The called party's settop controller 110 responds through the signaling adapter 208 to the session manager 202 by accepting or rejecting the request. In this example, the request is accepted (step 1612). Session manager 202 then invokes connection manager 204 to set up a broadband connection between the calling party and the called party (step 1614).

Connection manager 204 then invokes the resource adapters 206 for the broadband network 100 and the access network 108 to set up the transport connections (step 1616). Once the network resources are allocated, the session manager 202 sends a notification signal (steps 1618 and 1620) to the settop controllers 110 of both the calling party and the called party. In this embodiment, both the video and voice information are pumped down the broadband connection.

Thus far, the description concentrates on the structure and services provided by a broadband network. However, in accordance with the present invention, a broadband network can also be integrated with a telephone network to provide additional services and features.

Figure 17:
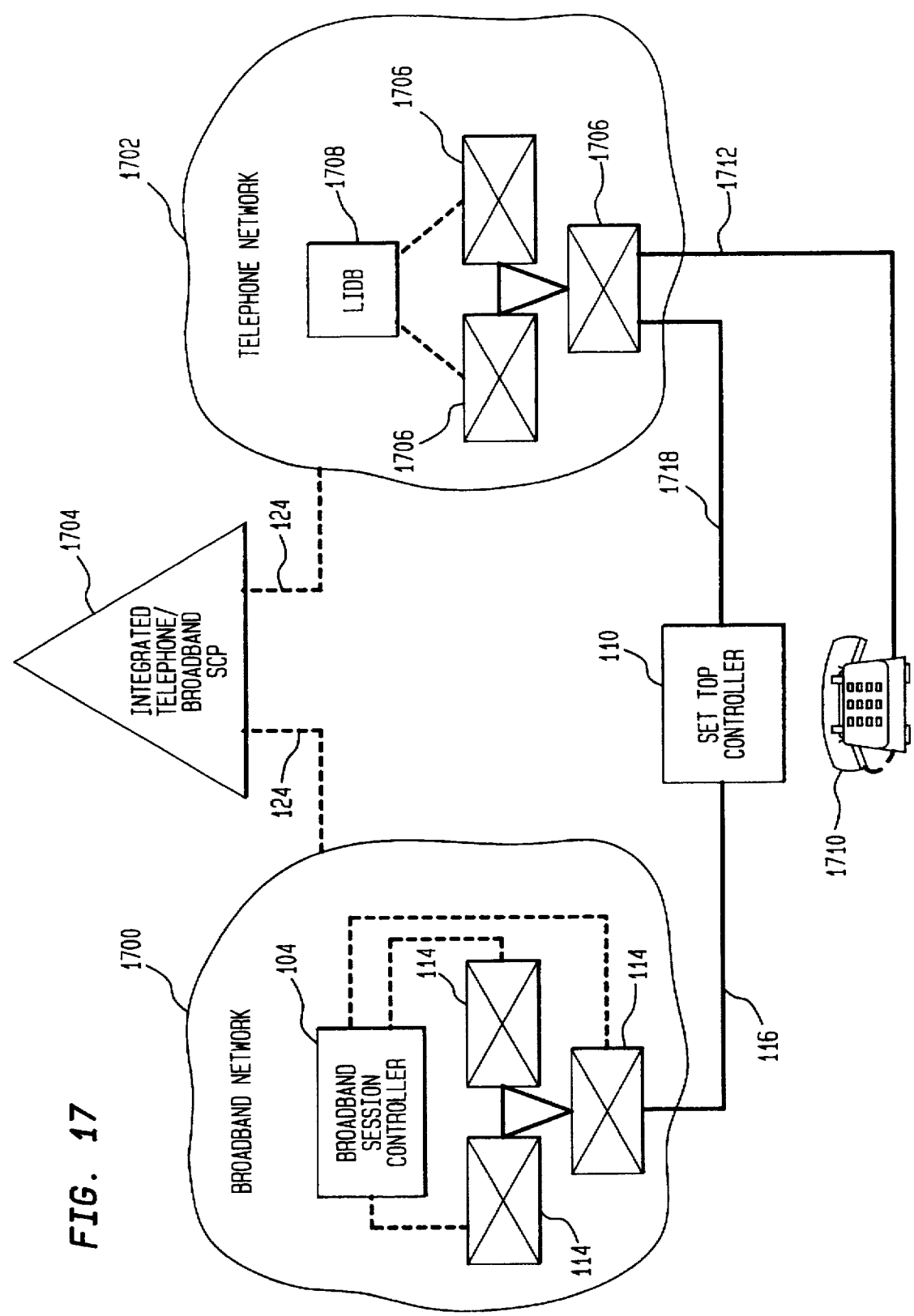
FIG. 17 is a block diagram of an integrated broadband and telephone network in accordance with one embodiment of the present invention.

FIG. 17 shows a block diagram of an integrated broadband and telephone network in accordance with one embodiment of the present invention. As shown, broadband network 1700 and telephone network 1702 communicate with an integrated broadband/telephone SCP ("BTSCP") 1704 via connections 124. Broadband network 1700 preferably includes the basic components of the broadband network as described above, including broadband switches 114 and broadband session controller 104. Broadband switches 114 connect to a user's settop controller 110 to provide broadband information as described above.

Telephone network 1702 may include any conventional telephone network including the PSTN, intelligent network ("IN"), or advanced intelligent network ("AIN"). The AIN is described in more detail in the incorporated patent applications. FIG. 17 shows only the basic switches 1706 and a line information database ("LIDB") 1708 of the telephone network.

Figure 18:
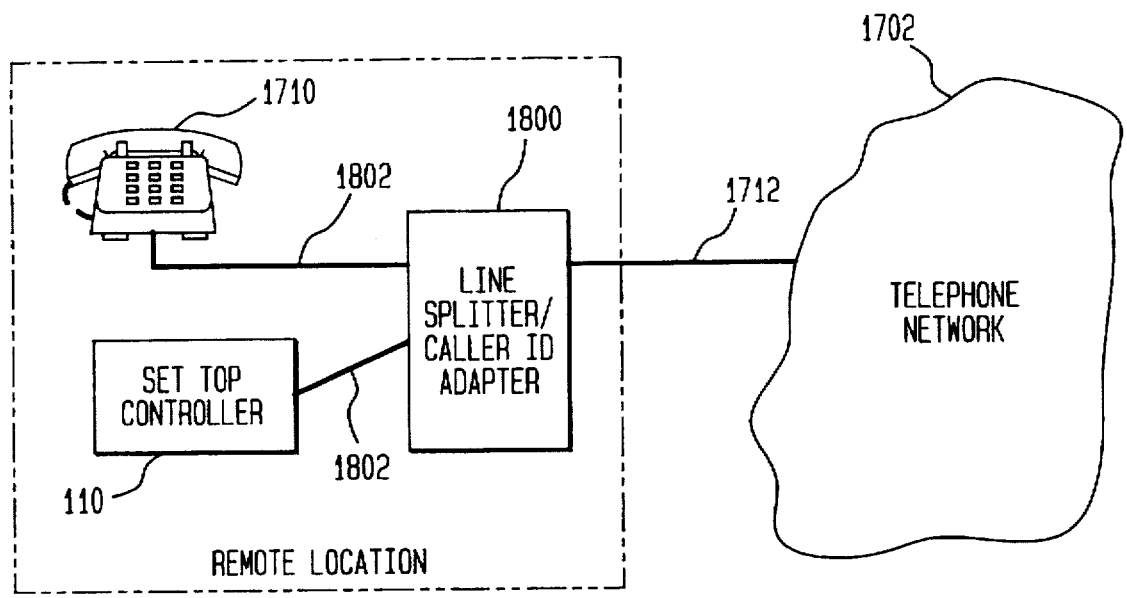
FIG. 18 is a block diagram of an alternative scheme for connecting a remote location to a telephone network in accordance with one embodiment of the present invention.

As described above, AIN switches 1706 rely on instructions from an SCP to provide call processing information. Thus, switches 1706 of telephone network 1702 connect to the BTSCP 1704 via connections 124. Switches 1706 also connect to end-user call processing equipment 1710, such as telephones, via conventional connections 1712. In addition, in accordance with the present invention, switches 1706 could connect directly to a settop controller 110 at a user's remote location. Although FIG. 17 shows separate connections 1712 and 1714 from a telephone switch 1706 to a user's CPE 1710 and settop controller 110, only a single connection may be necessary. This embodiment is shown, for example, in FIG. 18, where a single connection 1712 connects a telephone network 1702 to a remote location. In this embodiment, a line splitter/caller I.D. adapter 1800 splits the telephone connection 1712 and feeds telephone extensions 1802 to CPE 1710 and settop controller 110. The functionality of the caller I.D. adapter portion is disclosed in more detail below.

Figure 19:
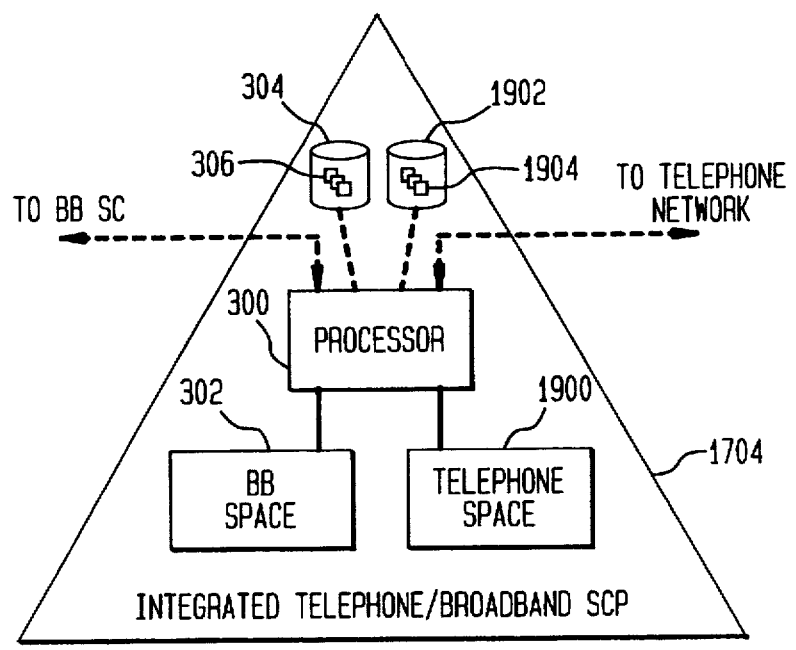
FIG. 19 is a block diagram of an integrated telephone/ broadband service control point in accordance with one embodiment of the present invention.

In accordance with the present invention, integrated BTSCP 1704 provides processing instructions to both the broadband network 1700 and telephone network 1702 to integrate services across these networks in an efficient and effective manner. As shown in the embodiment of FIG. 19, to integrate the two networks, the integrated BTSCP 1704 includes both a broadband SPACE application 302 and a telephone SPACE application 1900. Again, the basic telephone SPACE application 1900 is described in the incorporated patent applications. In an alternative embodiment, the broadband SPACE application 302 and telephone SPACE application 1900 exist as a single integrated application.

In one embodiment, BTSCP 1704 includes database 304 containing BPRs 306, and an additional database 1902 including telephone call processing records CPRs 1904. CPRs are also described in the incorporated patent applications. In an alternative embodiment, both BPRs 306 and CPRs 1504 are included in a single database. Processor 300 responds to triggers from either broadband network 1700 or telephone network 1702, executes the corresponding SPACE application 302 or 1900, and accesses the appropriate database 304 or 1902 to provide processing instructions to either network.

Although in one embodiment of the invention, the broadband and telephone functions are provided in an integrated SCP, in an alternative embodiment, the functions are distributed across multiple SCPs.

By integrating the broadband and telephone networks, the present invention provides new network-based services for end-users. For example, in accordance with the present invention, an end-user can now provision video and telephone services via a display interface at the user's remote location. The display interface in this embodiment preferably comprises the video display 112 (or television) connected to settop controller 110, as shown, for example, in FIG. 1B.

Figure 20:
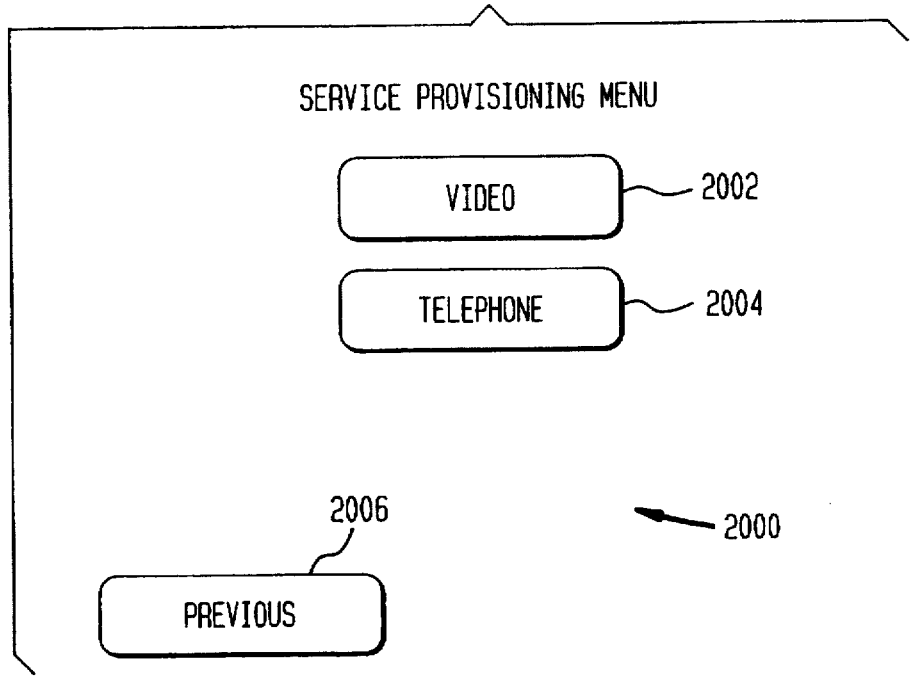
FIG. 20 illustrates an example of a service provisioning menu in accordance with one embodiment of the present invention.

To provision video and/or telephone services via a display interface, the present invention provides a service provisioning menu similar to the broadband menus described above. FIG. 20 illustrates the service provisioning menu. Just as any other broadband menu described above, the service provisioning menu of FIG. 20 can originate at several sources, including the integrated BTSCP 1704, intelligent peripheral 1100, BSC 104, or settop controller 110.

As shown in FIG. 20, service provisioning menu 2000 preferably includes a video button 2002, a telephone button 2004, and a PREVIOUS button 2006. Selection of the video button 2002 preferably displays a list of video-based services that may be provisioned, while selection of telephone button 2004 preferably displays a list of telephone services that may be provisioned. PREVIOUS button 2006 permits a user to return to previous menus.

Figure 21:
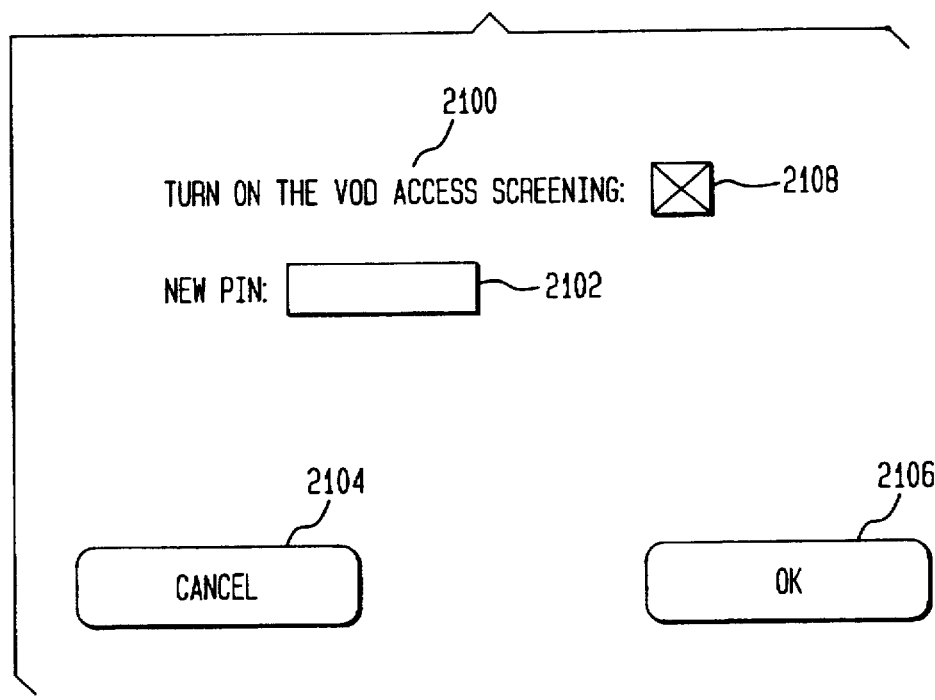
FIG. 21 is an example of a video-on-demand access screening menu in accordance with one embodiment of the present invention.

One example of a broadband network-based service that may be provisioned by an end-user in accordance with one embodiment of the invention, is a video-on-demand access screening service. For this service, a user selects VOD access screening from a list of video services (not shown) that would be displayed after selecting the video button 2002. Broadband network 1700 responds to this selection by displaying a menu like that shown, for example, in FIG. 21. The menu includes a line which reads, "Turn on the VOD access screening:" 2100 and a "new PIN" field 2102. To enable VOD access screening, the user selects the VOD access screening line 2100 by selecting a box 2108 associated therewith and entering a PIN in the new PIN field 2102. CANCEL button 2104 allows a user to cancel any changes and return to a previous menu. OK button 2106 allows a user to enable the service after completing the menu. As described for other broadband services above, information collected by the VOD access screening menu is transmitted back to the integrated BTSCP 1704 and added to the user's BPR 306.

As discussed above, a user can also provision telephone services via a video interface in accordance with the present invention. To provide telephone services, a user selects the telephone button 2004 in the service provisioning menu 2000 of FIG. 20. FIG. 22 shows an exemplary list of telephone-based services that would be displayed in response to selection of the telephone button 2004. For example, the telephone service provisioning menu of FIG. 22 may permit a user to turn on a call blocking feature (line 2200). Should the user select incoming call blocking 2200, the user can also exclude certain telephone numbers from the blocking service if desired (line 2202). The telephone service processing menu may also permit a user to turn on a caller I.D. display feature (line 2204) or to consider the call histories of recent incoming calls (line 2206). The telephone menu of FIG. 22 also includes a cancel button 2208 and an OK button 2210.

FIG. 23 illustrates a call history service display for a user's display 112 in response to selection of the call history button 2206 in FIG. 22. Field 2300 shows a list of a predetermined number of most recent calls, the date and time of the calls, and the status of the calls (delivered or blocked). In addition, in accordance with the present invention, the call history includes caller I.D. information, including the caller's telephone number and the caller's name. This caller I.D. information will be described in more detail below. The call history menu also includes a MORE button 2302 to move forward through the list, and a PREVIOUS button 2304 to display previous screens.

Figure 24:
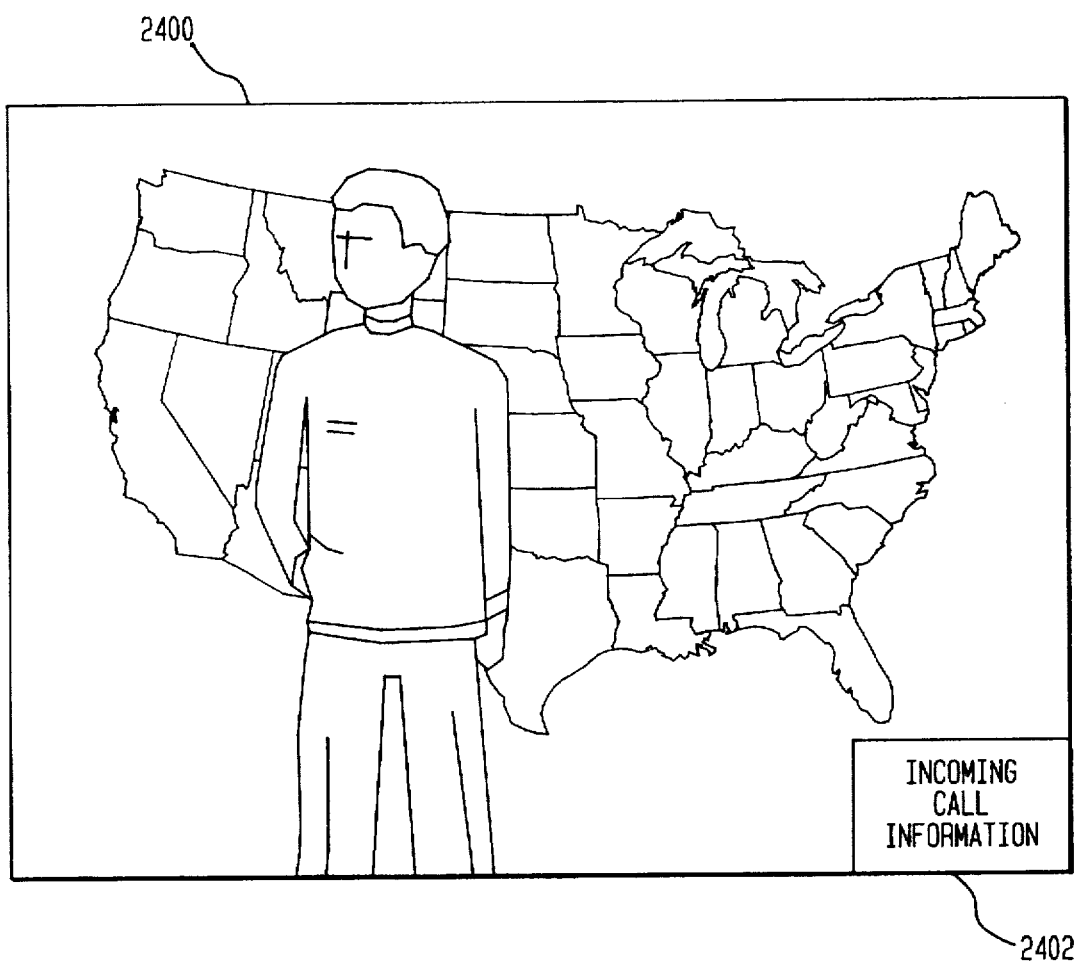
FIG. 24 shows an incoming call information menu displayed on a display screen in accordance with one embodiment of the present invention.

As mentioned above, the present invention provides for video-based caller I.D. delivery. FIG. 24 helps illustrate this service. FIG. 24 shows a conventional television program, such as a weather report, being displayed on a user's display 112. When a call is placed to that user's telephone, in accordance with conventional techniques, the call rings the user's telephone. However, in accordance with the present invention, caller I.D. information is transmitted to the settop controller 110 which displays the incoming caller I.D. information on a window 2402 of the display 112.

Figure 25:
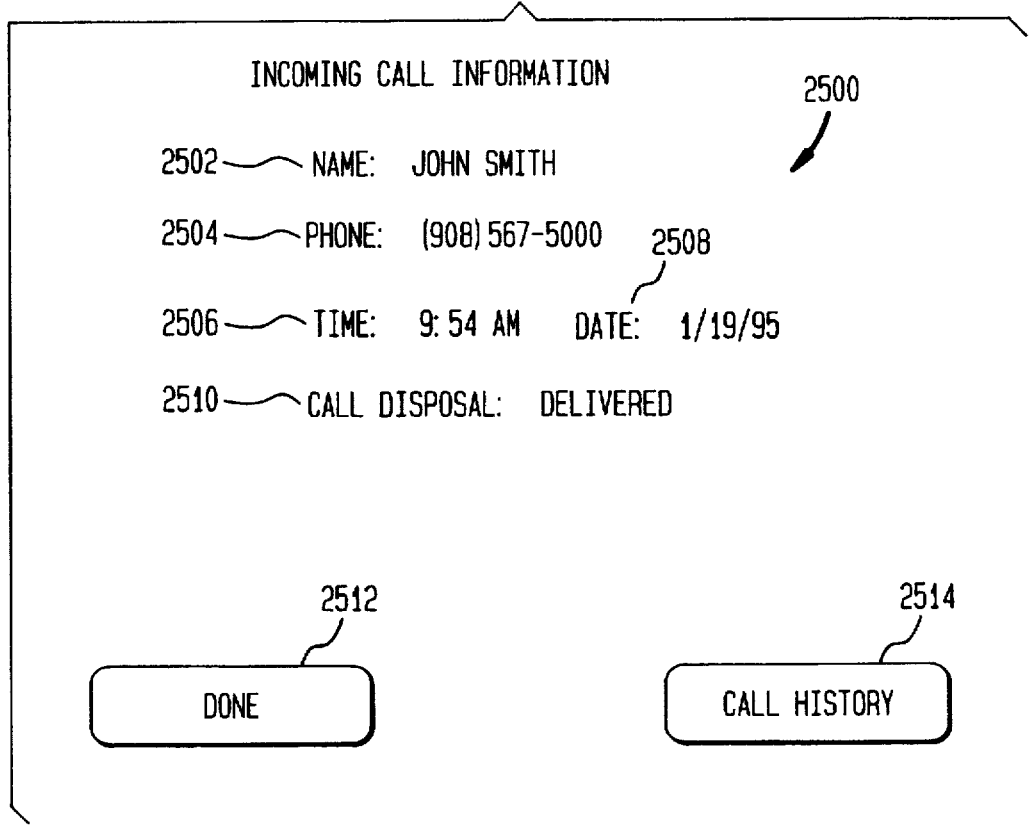
FIG. 25 is an example of an incoming call information menu in accordance with one embodiment of the present invention.

FIG. 25 shows an exemplary listing of the incoming call information that may be displayed in the display window of the user's display 112. The incoming call information 2500 preferably lists the name of the caller (field 2502), the caller's telephone number (field 2504), the time of the call (field 2506), and date of the call (field 2508), and the disposition of the call (field 2510). Call disposition field 2510 informs the user if the call is being delivered or blocked, provided the user subscribes to a call blocking feature. DONE button 2512 permits the user to go back to a normal viewing screen. CALL HISTORY button 2514 provides the same function as call history field 2206 in FIG. 22.

The processing operation of the integrated broadband and telephone network for providing the incoming call information will now be described with reference to FIGS. 26 and 27. In a first embodiment, the caller I.D. adapter portion of the line splitter/caller I.D. adapter 1800 (FIG. 18) (henceforth referred to only as "the caller I.D. adapter") provides the same functionality as today's conventional caller I.D. devices that are connected to user's telephone lines to identify incoming callers. In this embodiment, the caller I.D. adapter 1800 rings the user's telephone 1710, and sends the caller I.D. information to the user's settop controller 110, which incorporates the caller I.D. information into the appropriate fields (2502 and 2504) of the incoming call information window 2500 (FIG. 25) for the user's display 112.

Figure 26:
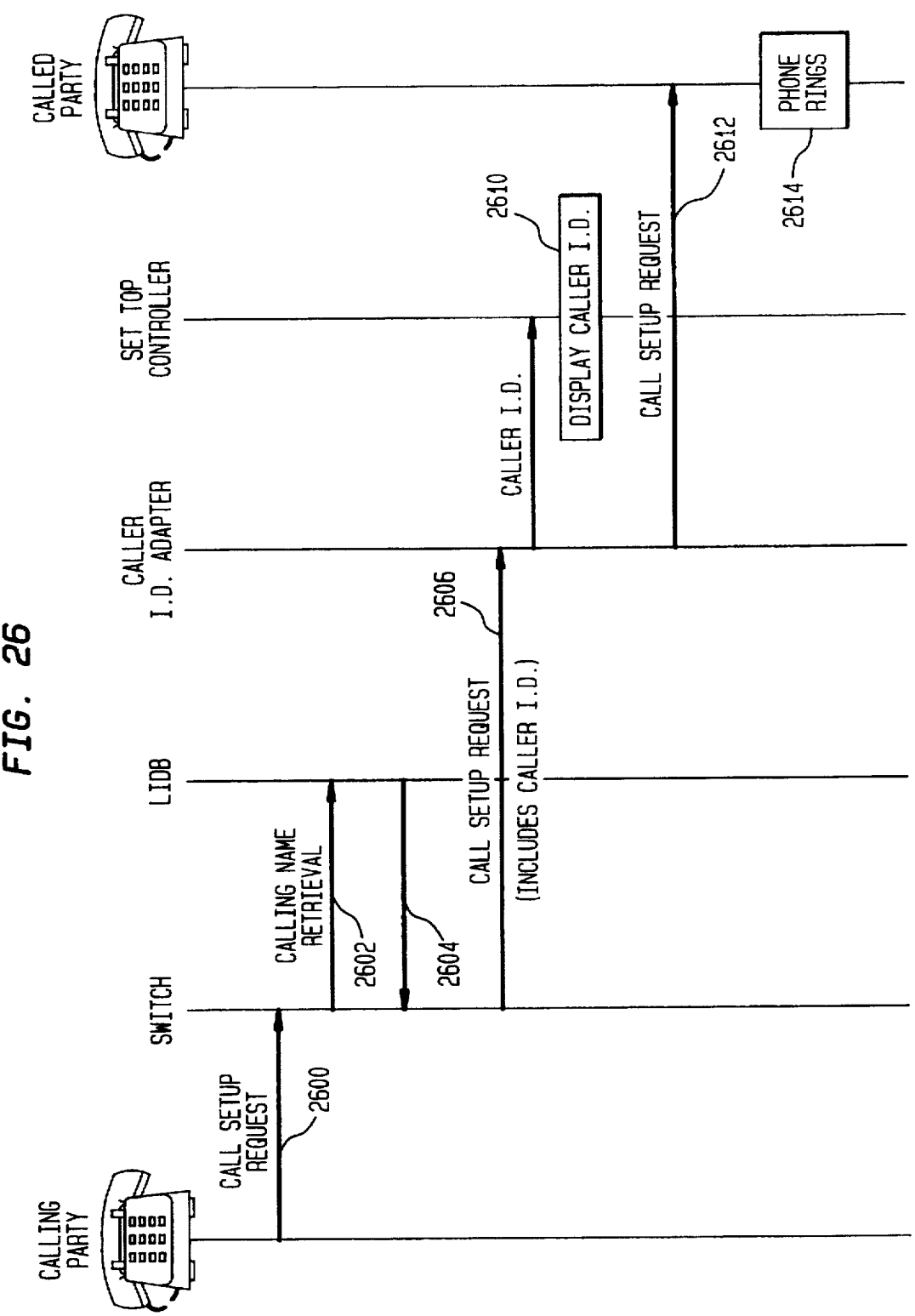
FIG. 26 is a processing flow diagram for providing video-based caller I.D. information in accordance with one embodiment of the present invention.

FIG. 26 shows the processing operation diagram to provide the video-based caller I.D. information in accordance with the first embodiment of the present invention. In this embodiment, the processing of a telephone call through the telephone network is performed in a manner consistent with today's conventional caller I.D. service.

Initially, a calling party places a call to a user (called party), which causes the calling party's telephone to transmit a call setup request to a telephone switch (step 2600). The switch responds to the call by sending a calling name retrieval request to LIDB (step 2602). LIDB matches the calling party's telephone number to the calling party's name and returns the calling party's name to the switch (step 2604). The switch then transmits a call setup request (including caller identification information) to the caller's telephone (step 2606). However, in the present invention, caller I.D. adapter 1800 receives this call setup request and sends the caller I.D. information contained in the call setup request to the settop controller 110 (step 2608). The settop controller then displays the caller information in a window (step 2610), as shown in FIG. 24. At the same time, caller I.D. adapter 1800 sends the call setup request information to the called party's telephone (step 2612) to ring the telephone (step 2614). The called party can review the caller information being displayed and determine whether to answer the phone. Although in this embodiment the caller I.D. information is sent to a settop controller 110 to be displayed on display 112, in alternative embodiments, the line splitter/caller I.D. adapter 1800 may pass the caller I.D. information directly to CPE 1710 for display or display the caller I.D. information directly.

As just described, to provide caller I.D. information according to the embodiment shown in FIG. 26, the invention does not require a broadband network to deliver the caller I.D. information. Rather, the caller information is provided to a remote location in accordance with conventional telephone network techniques. In an alternative embodiment, however, the caller I.D. information can also be delivered to the called party's display via a broadband network 1700.

Figure 27:
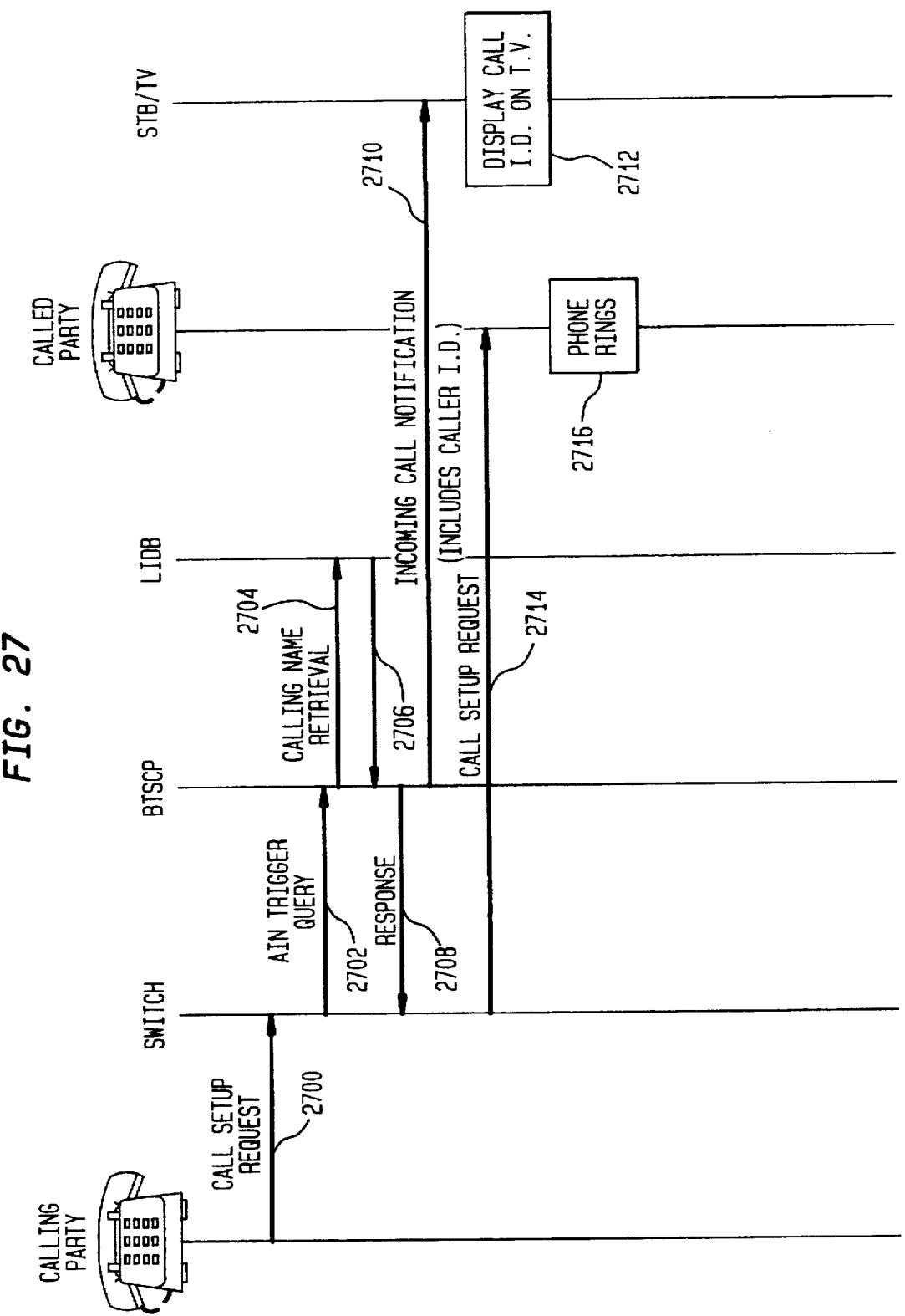
FIG. 27 is a processing flow diagram for providing video-based caller I.D. information in accordance with another embodiment of the present invention.

Referring to FIG. 27, initially, a calling party dials a user's (called party's) telephone number. Again, the calling party's telephone sends a call setup request to the telephone switch (step 2700). In this embodiment, the telephone switch preferably sends a trigger query to BTSCP 1704 (step 2702). The BTSCP then requests a calling name from LIDB (step 2704), which returns the calling party's name (step 2706). BTSCP 1704 instructs the switch to confirm call setup to the telephone switch (step 2708), and forwards the caller information to the called party's settop controller 110 via the broadband network 1700 (step 2710), which the settop controller displays on display 112 (step 2702). The telephone switch sends the call setup request to the called party's telephone (step 2714) to ring the phone (step 2716). Accordingly, at approximately the same time, the called party's telephone rings, and the settop controller displays the call identification information on the user's video display 112. Alternatively, BTSCP could return to the switch the calling party's name for delivering to traditional caller ID display devices.

While there has been illustrated and described what are at present considered to be preferred embodiments and methods of the present invention, it will be understood by those skilled in the art that various changes and modifications may be made, and equivalents may be substituted for elements thereof without departing from the true scope of the invention. For example, in the preferred embodiments, BSCP 106 provides processing instructions and/or data in response to services originated by BSC 104. In alternative embodiments, however, BSCP 106 could communicate directly with an information sender/receiver 101 and provide processing instructions and/or data in response to direct queries from an information sender/receiver 101 via BSC 104, BSN 100, or some other communication facility.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

We claim:

1. A videoconferencing system comprising:

a plurality of videoconferencing user stations, each user station including a video camera, a microphone, a video display, and a speaker;

a plurality of videoconferencing user station controllers, each of said controllers at one of said videoconferencing user stations controlling said video camera, microphone, video display and speaker and including control applications for controlling signaling and broadband contents information flow to and from said videoconferencing user station; and a broadband switching network, said network including:

a broadband session controller for communicating with each of said videoconferencing user stations; and a broadband service control point connected to said broadband session controller, said control point including a database having broadband processing records having information specific to said videoconferencing user stations and a processor for accessing said processing records and for sending to said broadband session controller processing information specific to a user station in response to a trigger;

said broadband session controller including:

means responsive to a videoconferencing request from a calling user station for requesting processing instructions from said broadband service control point;

means responsive to said processing instructions for sending a videoconferencing service request to the videoconferencing user station controller of a called user station; and means for establishing a broadband connection between said videoconferencing user station controllers of said calling and said called user stations in response to an accept signal from said called user station videoconferencing controller.

2. In a videoconferencing network including a plurality of videoconferencing user stations, a plurality of videoconferencing user station controllers having control applications for controlling signaling and broadband contents information flow to and from the videoconferencing user station, and a broadband switching network including a broadband session controller and a broadband service control point having a database of broadband processing records having information specific to each user station, a method for providing videoconferencing comprising the steps of:

requesting, at a calling party's user station controller, a videoconference with a called party;

requesting processing information from the broadband service control point in response to said videoconference request;

executing a broadband processing record at the broadband service control point in response to said processing information request;

sending a videoconference session request signal to a called party's user station controller in response to the broadband processing record execution request; and establishing a videoconference connection between said calling party's user station controller and said called party's user station controller in response to an accept signal from said called party's user station controller.

* * * * *